US011503422B2

United States Patent
Kratz et al.

(10) Patent No.: US 11,503,422 B2
(45) Date of Patent: Nov. 15, 2022

(54) MAPPING VIRTUAL SOUND SOURCES TO PHYSICAL SPEAKERS IN EXTENDED REALITY APPLICATIONS

(71) Applicant: HARMAN INTERNATIONAL INDUSTRIES, INCORPORATED, Stamford, CT (US)

(72) Inventors: Sven Kratz, Mountain View, CA (US); Adam Boulanger, Palo Alto, CA (US); Joseph Verbeke, San Francisco, CA (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/254,527

(22) Filed: Jan. 22, 2019

(65) Prior Publication Data

US 2020/0236487 A1    Jul. 23, 2020

(51) Int. Cl.
*H04S 7/00* (2006.01)
*H04R 5/02* (2006.01)
(Continued)

(52) U.S. Cl.
CPC .............. *H04S 7/303* (2013.01); *H04R 5/02* (2013.01); *H04R 5/04* (2013.01); *H04S 3/008* (2013.01);
(Continued)

(58) Field of Classification Search
CPC ...... H04S 7/303; H04S 3/008; H04S 2400/01; H04R 5/02; H04R 5/04; G10L 19/20; A63F 13/87; H04L 65/403
See application file for complete search history.

(56) References Cited

U.S. PATENT DOCUMENTS 6,075,868 A  *  6/2000  Goldfarb .................. H04R 1/02
                                                    381/301
9,363,603 B1 *  6/2016  Cabot ..................... H04S 3/008
(Continued)

FOREIGN PATENT DOCUMENTS

CN        108632709 A     10/2018
GB          2497333 A  *   6/2013  ............... H04R 3/14
KR       20140123746 A  *  10/2014

OTHER PUBLICATIONS

Final Office Action received for U.S. Appl. No. 16/151,996, dated Oct. 14, 2020, 32 pages.
(Continued)

*Primary Examiner* — Matthew A Eason
*Assistant Examiner* — Kuassi A Ganmavo
(74) *Attorney, Agent, or Firm* — Artegis Law Group, LLP

(57) ABSTRACT

One or more embodiments include an audio processing system for generating an audio scene for an extended reality (XR) environment. The audio processing system determines that a first virtual sound source associated with the XR environment affects a sound in the audio scene. The audio processing system generates a sound component associated with the first virtual sound source based on a contribution of the first virtual sound source to the audio scene. The audio processing system maps the sound component to a first loudspeaker included in a plurality of loudspeakers. The audio processing system outputs at least a first portion of the component for playback on the first loudspeaker.

21 Claims, 12 Drawing Sheets

(51) Int. Cl.
    *H04R 5/04*     (2006.01)
    *H04S 3/00*     (2006.01)
    *H04L 65/403*     (2022.01)
    *G10L 19/20*     (2013.01)

(52) U.S. Cl.
    CPC ............ *G10L 19/20* (2013.01); *H04L 65/403* (2013.01); *H04S 2400/01* (2013.01)

(56) References Cited

U.S. PATENT DOCUMENTS

| | | | |
|---|---|---|---|
| 10,148,912 B1 | 12/2018 | Oliver et al. | |
| 2002/0031231 A1* | 3/2002 | Oinoue | H04S 1/002 381/1 |
| 2005/0179701 A1* | 8/2005 | Jahnke | H04S 7/30 345/619 |
| 2005/0253713 A1 | 11/2005 | Yokota | |
| 2006/0062411 A1* | 3/2006 | Sako | H04S 3/002 381/310 |
| 2010/0173708 A1* | 7/2010 | Yamakawa | A63F 13/812 463/35 |
| 2010/0211199 A1* | 8/2010 | Naik | G10L 21/00 700/94 |
| 2012/0237063 A1* | 9/2012 | Korn | H04S 3/002 381/304 |
| 2013/0329922 A1* | 12/2013 | Lemieux | H04S 7/30 381/307 |
| 2014/0136195 A1 | 5/2014 | Abdossalami et al. | |
| 2015/0092944 A1* | 4/2015 | Someda | H04S 7/302 381/1 |
| 2015/0223002 A1* | 8/2015 | Mehta | H04S 7/30 381/303 |
| 2015/0245159 A1* | 8/2015 | Osman | H04S 7/304 381/303 |
| 2015/0325226 A1* | 11/2015 | Rosedale | G10H 1/0091 381/119 |
| 2015/0332680 A1* | 11/2015 | Crockett | G10L 19/008 381/23 |
| 2016/0007133 A1* | 1/2016 | Mateos Sole | H04S 5/005 381/18 |
| 2016/0037280 A1* | 2/2016 | Tsingos | H04S 3/00 381/17 |
| 2016/0212538 A1* | 7/2016 | Fullam | G06K 9/0057 |
| 2016/0212559 A1* | 7/2016 | Mateos Sole | H04S 7/30 |
| 2017/0076720 A1 | 3/2017 | Gopalan et al. | |
| 2017/0094464 A1 | 3/2017 | Chu et al. | |
| 2017/0127206 A1* | 5/2017 | Skovenborg | H04R 29/007 |
| 2018/0007489 A1* | 1/2018 | Lehtiniemi | G06F 3/167 |
| 2018/0053364 A1 | 2/2018 | Bhattacharya et al. | |
| 2018/0270602 A1* | 9/2018 | Laaksonen | H04S 7/303 |
| 2018/0324543 A1 | 11/2018 | Robinson et al. | |
| 2018/0359592 A1* | 12/2018 | Laaksonen | H04S 7/303 |
| 2019/0088257 A1 | 3/2019 | Shah et al. | |
| 2019/0342661 A1* | 11/2019 | Bharitkar | G10L 25/18 |

OTHER PUBLICATIONS

Extended European Search Report for application No. 20152185.3 dated May 29, 2020.

Youngblut et al., "Review of Virtual Environment Interface Technology Chapter 4 Auditory", Interfaces, IDA paper P-3186, Institute for Defense Analyses, Mar. 1, 1996, pp. 79-96.

\* cited by examiner

MAPPING VIRTUAL SOUND SOURCES TO PHYSICAL SPEAKERS IN EXTENDED REALITY APPLICATIONS

BACKGROUND

Field of the Embodiments of the Present Disclosure

Embodiments of the present disclosure relate generally to audio signal processing and, more specifically, to mapping virtual sound sources to physical speakers in extended reality applications.

Description of the Related Art

Extended reality (XR) systems, such as augmented reality (AR) systems and virtual reality (VR) systems, are increasingly popular approaches for experiencing immersive computer-generated and pre-recorded audiovisual environments. In an AR system, virtual computer-generated objects are projected relative to a real-world environment. In one type of AR system, a user wears a special transparent device, such as an AR headset, through which the user views physical objects in the real world along with computer-generated virtual objects that are rendered onto a display surface of the AR headset. In other types of AR systems, a device projects images of the virtual objects directly onto the user's eyes as the user views the physical real-world environment. In yet other types of AR systems, a user holds a mobile device, such as a smartphone or tablet computer. A camera associated with the mobile device captures an image of the physical real-world environment. A processor associated with the mobile device then renders one or more virtual objects and overlays the rendered virtual objects onto a display screen of the mobile device. For any of these types of AR systems, the virtual objects appear as objects in the physical real-world environment.

Similarly, in a VR system, virtual computer-generated objects are projected onto a virtual, computer-generated environment. In a typical VR system, a user wears a special device, such as a VR headset, through which the user views virtual objects in the virtual environment.

In addition, the XR system typically includes a pair of headphones for delivering spatial audio directly to the user's ears. Spatial audio in an XR system involves the rendering of virtual sound sources, also referred to herein as "virtual sound artifacts," along with environmental effects, such as echo or reverberation, depending on the characteristics of the virtual space that the XR user is viewing. The complete set of virtual sound sources and associated environmental effects is referred to herein as an "audio scene" or a "sound scene." Various virtual sound sources in the environment may be stationary or mobile. A stationary virtual sound source is a sound source that remains in a fixed position, as perceived by the user. In contrast, a mobile virtual sound source is a sound source that appears to move from one position to another, as perceived by the user.

Because the location of the left headphone speaker and right headphone speaker are known relative to the user's ears, the XR system is able to accurately generate a realistic audio scene that includes all stationary and mobile virtual sound sources. In general, the XR system renders virtual sound sources so as to have the best possible correlation (e.g., based on hearing angle, perceived distance, and/or perceived loudness) between a virtual sound source heard by the user and the corresponding VR object seen by the user on the display of the XR headset. In this manner, VR objects and corresponding virtual sound sources are experienced as being realistic, relative to how the object would be seen and heard in a real-world environment.

One problem with the above approach is that an audio scene experienced via headphones is oftentimes not as realistic relative to the same audio scene experienced via one or more loudspeakers placed in the physical environment. As one example, loudspeakers typically produce sound waves with significantly more sound wave pressure than the sound waves produced via headphones. As a result, loudspeakers may generate a sound pressure level (SPL) that induces a physical sensation of the user, whereas headphones are generally incapable of generating such a SPL. Further, loudspeakers are generally able to generate audio signals with greater directionality and locality relative to headphones. As a result, audio from virtual sound sources and environmental effects that emanate from physical loudspeakers may sound and feel more realistic relative to audio from the same sources and effects emanating only from headphones. In general, virtual sound sources and environmental effects heard via loudspeakers appear to be more realistic as compared to the same virtual sound sources and environmental effects heard via headphones. Further, the increased sound wave pressure produced by loudspeakers may provide visceral effects that are generally not available from the sound produced by headphones. Therefore, with a loudspeaker system, the user may be able to more realistically hear and also feel the audio scene produced by the loudspeaker system relative to an audio scene produced by headphones.

One drawback of loudspeaker-based systems, however, is that an XR system is generally unable to precisely position and orient a sound in between two or more loudspeakers in a loudspeaker system. As a result, current XR systems are not able to accurately implement dynamic positioning of virtual sound sources in a loudspeaker system in the same manner as with headphones-based XR systems. Consequently, current XR systems are generally unable to render a realistic audio scene via a loudspeaker system.

As the foregoing illustrates, improved techniques for generating audio scenes for XR environments would be useful.

SUMMARY

Various embodiments of the present disclosure set forth a computer-implemented method for generating an audio scene for an extended reality (XR) environment. The method includes determining that a first virtual sound source associated with the XR environment affects a sound in the audio scene. The method further includes generating a sound component associated with the first virtual sound source based on a contribution of the first virtual sound source to the audio scene. The method further includes mapping the sound component to a first loudspeaker included in a plurality of loudspeakers. The method further includes outputting at least a first portion of the component for playback on the first loudspeaker.

Other embodiments include, without limitation, an audio processing system that implements one or more aspects of the disclosed techniques, and a computer readable medium including instructions for performing one or more aspects of the disclosed techniques, as well as a method for performing one or more aspects of the disclosed techniques.

At least one technical advantage of the disclosed techniques relative to the prior art is that audio scenes for XR environments are generated with improved realism and immersive quality relative to prior approaches. Via the disclosed techniques, virtual sound sources are rendered with increased realism through dynamic spatialization of XR virtual audio sources in relation to the location, direction, and/or orientation of the user. Further, a user experiences better audio quality and a more realistic experience than is possible with headphones due to physical characteristics of speakers in terms of directionality and physical sound pressure.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the disclosure subsumes other embodiments as well.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

As further described herein, an audio processing system optimizes reproduction of an XR sound scene using available speakers, including standalone loudspeakers and head-mounted speaker systems, in an XR environment. The disclosed audio processing system optimizes the mapping of virtual sound sources in an XR system to physical speakers in the XR environment. In this manner, the audio processing system provides high-fidelity sound reproduction that closely represents the XR environment using the available speakers and speaker arrangement in the XR environment.

System Overview

Figure 1:
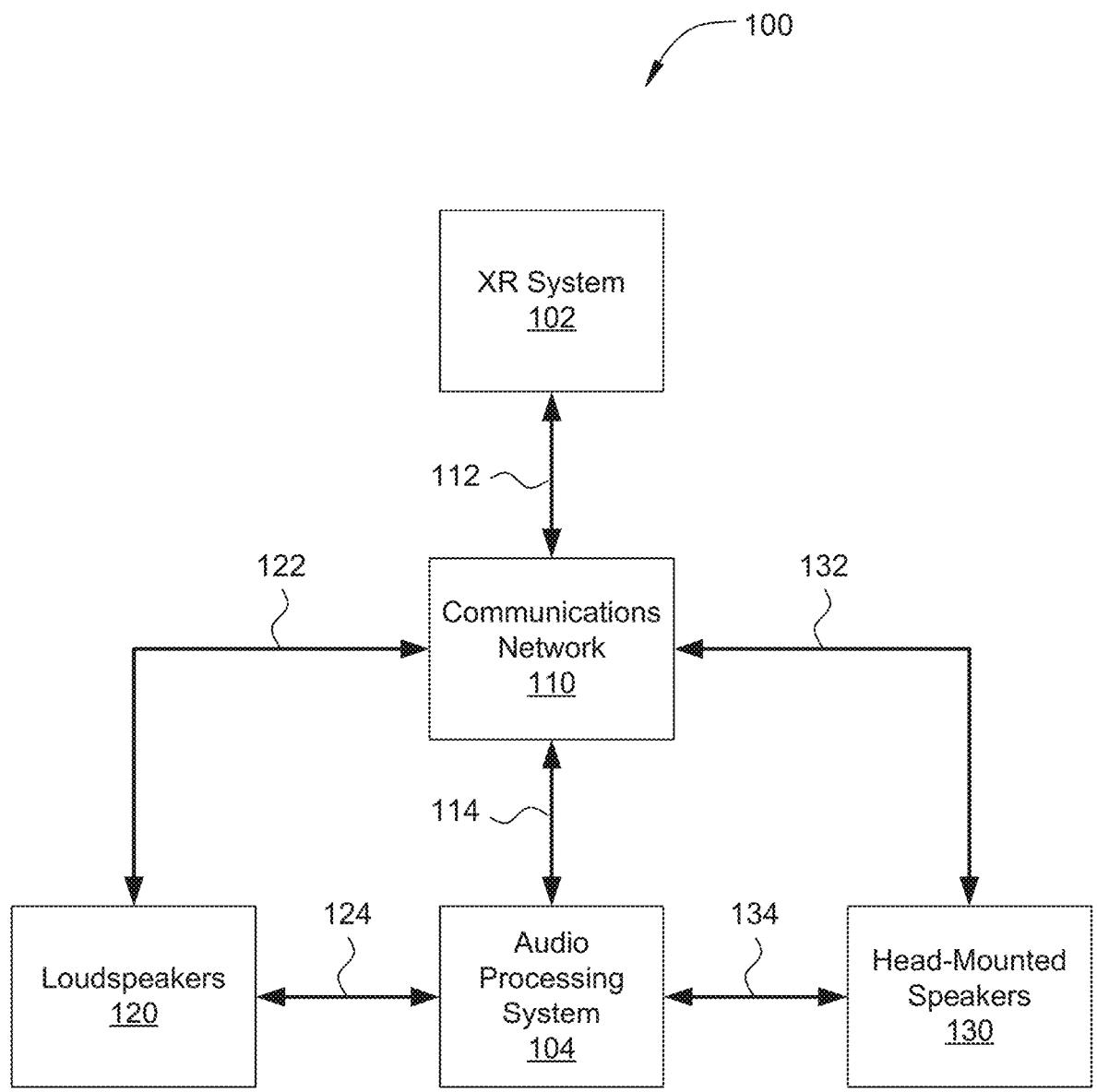
FIG. 1 illustrates a system configured to implement one or more aspects of the present disclosure.

FIG. 1 illustrates a system 100 configured to implement one or more aspects of the present disclosure. As shown, the system 100 includes, without limitation, an XR system 102, an audio processing system 104, loudspeakers 120, and head-mounted speakers 130 in communication with each other via a communications network 110. Communications network 110 may be any suitable environment to enable communications among remote or local computer systems and computing devices, including, without limitation, Bluetooth communications channels, wireless and wired LANs (Local Area Networks), and Internet-based WANs (Wide Area Networks). Additionally or alternatively, any technically feasible combination of XR system 102, audio processing system 104, loudspeakers 120, and head-mounted speakers 130 may communicate with each other over one or more point-to-point communications links, such as exemplary communications links 124 and 134.

XR system 102 includes, without limitation, a computing device that may be a standalone server, a cluster or "farm" of servers, one or more network appliances, or any other device suitable for implementing one or more aspects of the present disclosure. Illustratively, XR system 102 communicates over communications network 110 via communications link 112.

In operation, XR system 102 generates an XR environment that replicates a virtual scene, overlays a physical real-life scene with virtual content, and/or plays back panoramic (e.g., 360°) immersive video and/or audio content. The audio content is typically in the form of virtual sound sources, where the virtual sound sources may include, without limitation, virtual sound emitters, virtual sound absorbers, and virtual sound reflectors. A virtual sound emitter is a virtual sound source at a particular location and with a particular orientation and/or direction that generates one or more sounds and/or other audio signals. A virtual sound emitter may be ambient (non-localized with respect to the user), localized (at a fixed location in the XR environment), or mobile (moving within the XR environment).

With particular regard to ambient virtual sound sources, an ambient virtual sound source is a virtual sound source that does not have an apparent location, direction, or orientation. Therefore, the ambient virtual sound source seems to come from everywhere in the XR environment, rather than from a particular location, direction, and/or orientation. Such ambient virtual sound sources may be rendered to all loudspeakers at the same time. Additionally or alternatively, ambient virtual sound sources may be rendered to a non-directional loudspeaker, such as a subwoofer. In general, an ambient virtual sound source is an artificial construct for representing virtual sound sources that are perceived by the human ear as non-localized sound sources.

In a first example, the sound of rainfall is generated by a large number of raindrops falling, where each individual raindrop is, in theory, a localized or mobile sound source that contributes to the sound of the rainfall. In general, the human ear does not separately perceive the sound of each raindrop as a localized or mobile virtual sound source coming from a particular location, direction, and/or orientation. Instead, the human ear perceives the sound of rainfall as coming from everywhere within the XR environment. Consequently, XR system 102 could generate the sound of rainfall as an ambient virtual sound source, without loss of generality.

In a second example, the sound of applause is generated by a large number of people clapping their hands, where each individual handclap is, in theory, a localized or mobile sound source that contributes to the sound of the applause. In general, the human ear does not separately perceive the sound of each handclap as a localized or mobile virtual sound source coming from a particular location, direction, and/or orientation. Instead, the human ear perceives the sound of applause as coming from everywhere within the XR environment. Consequently, XR system 102 could generate the sound of applause as an ambient virtual sound source, without loss of generality.

In a third example, a single localized or mobile virtual sound source could generate sound in a room with many hard surfaces. As a result, the localized or mobile virtual sound source could generate many sound reflections or echoes as the sound waves emanating from the localized or mobile virtual sound source interacts with the hard surfaces. As one specific example, a coin dropped in a church or lecture hall may generate so many sound reflections or echoes that the human ear cannot perceive the particular location, direction, and/or orientation of the coin or of any of the individual sound reflections or echoes. Instead, the human ear perceives the sound of the coin drop along with the sound reflections or echoes as coming from everywhere within the XR environment. Consequently, XR system 102 could generate the sound of the coin drop along with the resulting sound reflections or echoes as an ambient virtual sound source, without loss of generality.

Additionally or alternatively, XR system 102 could generate localized or mobile virtual sound sources for each individual sound source that contributes to an ambient virtual sound source. XR system 102 could generate a separate localized or virtual sound source for each drop of rain in a rainfall, each handclap in an applauding audience, and each sound reflection or echo when a coin is dropped in a church. Audio processing system 104 would then render a separate audio signal for each localized or virtual sound source, and map each audio signal for each localized or virtual sound source to one or more speakers. In such cases, XR system 102 and audio processing system 104 would not necessarily generate and render an ambient virtual sound source for rainfall, applause, or sound reflections or echoes resulting from a coin drop.

A virtual sound absorber is a virtual sound source at a particular location and with a particular orientation and/or direction that absorbs at least a portion of the sounds and/or other audio signals that come into contact with the virtual sound absorber. Similarly, a virtual sound reflector is a virtual sound source at a particular location and with a particular orientation and/or direction that reflects at least a portion of the sounds and/or other audio signals that come into contact with the virtual sound reflector.

Further, XR system 102 typically includes sensing hardware to track the user's head pose and spatial position for the purposes of video and audio spatialization. XR system 102 transmits the user's head pose and spatial position to audio processing system 104 along with data corresponding to one or more virtual sound sources.

Audio processing system 104 includes, without limitation, a computing device that may be a standalone server, a cluster or "farm" of servers, one or more network appliances, or any other device suitable for implementing one or more aspects of the present disclosure. Illustratively, audio processing system 104 communicates over communications network 110 via communications link 114.

In operation, audio processing system 104 maps virtual sound sources in an XR environment to physical speakers in an XR user's physical viewing environment in a manner that optimally outputs or "renders" the audio associated with the XR environment. Audio processing system 104 optimizes the assignment of virtual sound sources to speakers given the characteristics of the XR environment, the virtual sound source objects, the physical speakers, and the user's physical environment. Audio processing system 104 then transmits the optimized audio signals to each of the loudspeakers 120 and, if present, to each of the head-mounted speakers 130.

Further, audio processing system 104 incorporates a speaker system, including one or more loudspeakers 120 and, optionally, one or more head-mounted speakers 130. The loudspeakers 120 may include one or more speakers at fixed locations within the physical environment, such as a room or a vehicle interior. In order to accurately generate realistic audio from the XR environment regardless of the particular physical environment, audio processing system 104 may compensate for the acoustic characteristics of the physical environment. For example, audio processing system 104 could compensate for undue echo or reverberation effects resulting from the physical environment. Audio processing system 104 would measure frequency response characteristics at various locations in the physical environment. Then, when generating the audio for the loudspeakers 120, audio processing system 104 would include an audio signal that may reverse or otherwise compensate for the acoustic characteristics of the physical environment.

When measuring the acoustic characteristics of the physical environment, audio processing system 104 may consider known properties of the loudspeakers 120 and of the physical environment. These known properties may include, without limitation, speaker directivity, speaker frequency response characteristics, spatial location of the speakers, and physical environment frequency response characteristics. In this regard, speaker directivity may include the property that sound emitted by low-frequency loudspeakers 120, such as subwoofers, is typically not perceived as originating from a particular location and is instead perceived as originating from the entire environment. By contrast, higher-frequency loudspeakers 120 emit sound waves that are more strongly perceived as originating from specific locations. Speaker directivity has implications for audio analysis and audio mapping, as further described herein. Speaker frequency response characteristics include consideration of the optimal playback frequency band for particular loudspeakers 120 and/or individual drivers within particular loudspeakers 120. Spatial location of the speakers may include consideration for the three-dimensional spatial location of each loudspeaker 120 within physical environment, relative to other loudspeakers and to the user. The spatial location of each speaker may include the location of the speaker within the physical space in the horizontal dimension as well as the height of the speaker in the vertical dimension. Physical environment frequency response characteristics include consideration for the frequency response characteristics, or transfer function, of the physical environment at each loudspeaker 120 location and at the location of each user.

Loudspeakers 120 convert one or more electrical signals into sound waves and direct the sound waves into the physical environment. Illustratively, loudspeakers 120 may communicate over communications network 110 via communications link 122. Additionally or alternatively, loudspeakers 120 may communicate with audio processing system 104 over point-to-point communications link 124.

Head-mounted speakers 130 convert one or more electrical signals into sound waves and direct the sound waves into the one or both of the left ear and the right ear of the user. Head-mounted speakers 130 may be of any technically feasible configuration, including, without limitation, headphones, earbuds, and speakers integrated into an XR headset. Illustratively, head-mounted speakers 130 may communicate over communications network 110 via communications link 132. Additionally or alternatively, head-mounted speakers 130 may communicate with audio processing system 104 over point-to-point communications link 134.

It will be appreciated that the system shown herein is illustrative and that variations and modifications are possible. For example, the system 100 may include any technically feasible number of loudspeakers 120. Further, in an XR environment with one user, the user may receive audio only from the loudspeakers 120 or may receive audio from both the loudspeakers 120 in conjunction with head-mounted speakers 130. Similarly, in a multiuser XR environment with two or more users, each of the users may receive audio only from the loudspeakers 120 or may receive audio from both the loudspeakers 120 in conjunction with head-mounted speakers 130. In some embodiments, some users may receive audio only from the loudspeakers 120 while other users may receive audio from both the loudspeakers 120 in conjunction with head-mounted speakers 130.

Operations of the Audio Processing System

As further described herein, audio processing system 104 renders an XR sound scene that includes multiple ambient, localized, and mobile virtual sound sources. Audio processing system 104 renders the XR sound scene onto a fixed speaker system within an XR environment. The XR environment may be an indoor location, such as a room, the passenger compartment of a car or other vehicle, or any other technically feasible environment. Via the techniques disclosed herein, audio processing system 104 replicates the XR sound scene with high-fidelity via the available speaker arrangement and speaker frequency response characteristics of a system of loudspeakers 120. To properly replicate the XR sound scene, audio processing system 104 maps a set of virtual sound sources associated with an XR system 102 to a set of physical speakers. In general, the physical speakers are in a fixed location within the XR environment.

Audio processing system 104 dynamically positions the virtual sound sources within the XR environment so as to appear to emanate from the correct location, direction and/or orientation within the XR environment. Further, audio processing system 104 dynamically adjusts the relative locations, directions, and/or orientations of the virtual sound sources as the virtual sound sources move in the XR environment and as the user's reference frame within the XR environment changes. As one example, audio processing system 104 could dynamically adjust the relative locations, directions, and/or orientations of the virtual sound sources as the user drives a virtual vehicle within the XR environment, executes turns, accelerates, and decelerates. In some embodiments, audio processing system 104 replicates the XR sound scene via a system of loudspeakers 120 in conjunction with one or more head-mounted speakers 130, where the head-mounted speakers 130 move in the physical environment as the associated user moves.

Figure 2:
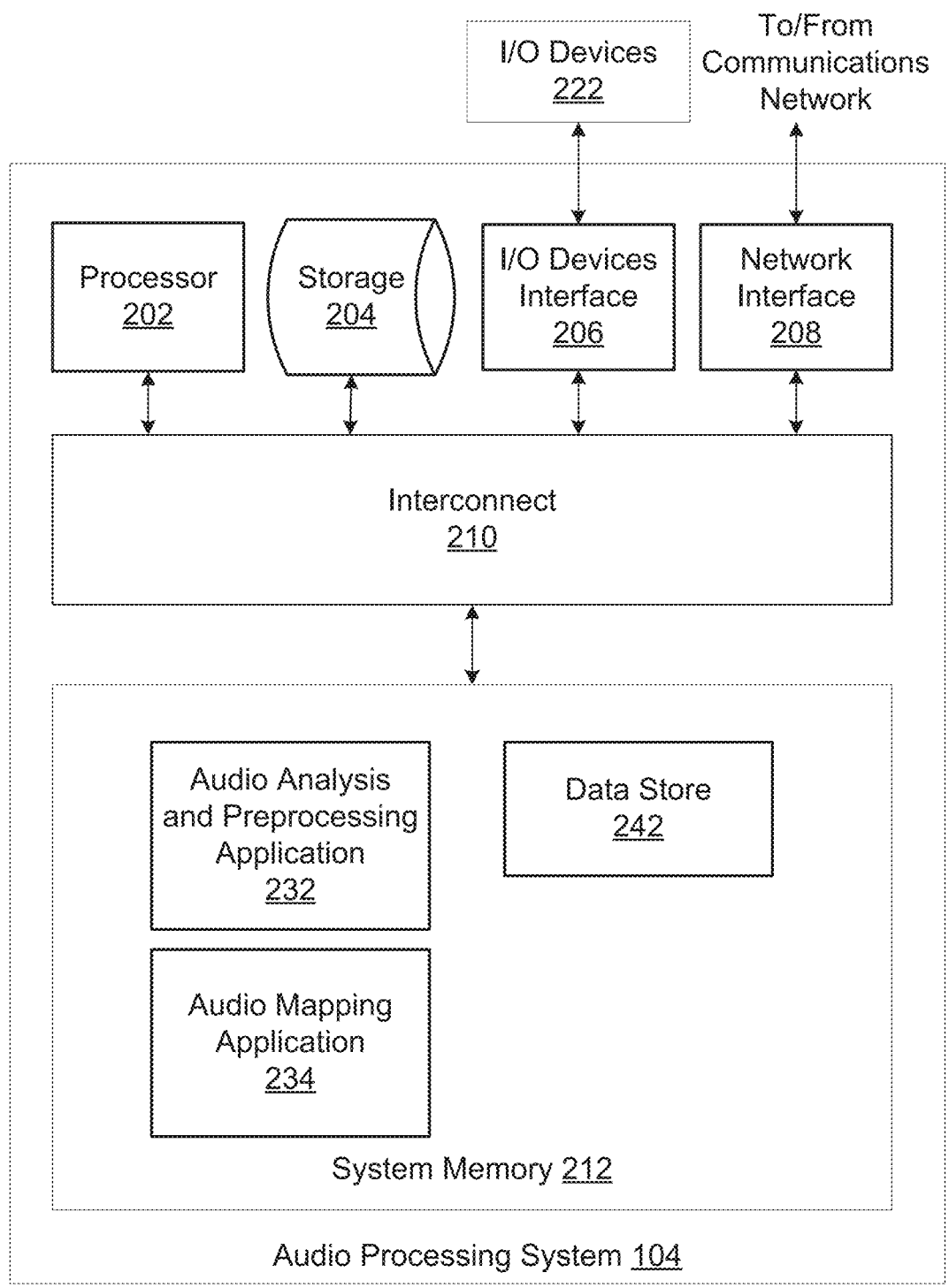
FIG. 2 is a more detailed illustration of the audio processing system of FIG. 1, according to various embodiments.

FIG. 2 is a more detailed illustration of the audio processing system 104 of FIG. 1, according to various embodiments. As shown, audio processing system 104 includes, without limitation, a processor 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one or more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, organic light-emitting diode (OLEO) display, or digital light processing (DLP) display. The display device may be a TV that includes a broadcast or cable tuner for receiving digital or analog television signals. The display device may be included in a VR/AR headset. Further, the display device may project an image onto one or more surfaces, such as walls or projection screens, or may project an image directly onto the eyes of a user.

Processor 202 is included to be representative of a single central processing unit (CPU), multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, an audio analysis and preprocessing application 232, an audio mapping application 234 and a data store 242. The audio analysis and preprocessing application 232 and the audio mapping application 234, when executed by the processor 202, perform one or more operations associated with the audio processing system 104 of FIG. 1, as further described herein. When performing the operations associated with the audio processing system 104, audio analysis and preprocessing application 232 and audio mapping application 234 may store data in and retrieve data from data store 242.

In operation, audio analysis and preprocessing application 232 determines the audio properties of virtual sound sources in regards to rendering sound components of the audio data related to the virtual sound sources via one or more loudspeakers 120 and/or head-mounted speakers 130. Certain virtual sound sources may correspond to visual objects in the XR environment that generate sound. Additionally or alternatively, certain virtual sound sources may correspond to particular audio generating locations in the XR environment scene that have no corresponding visual object. Additionally or alternatively, certain virtual sound sources may correspond to environmental or background audio tracks that have no locations or corresponding visual objects in the XR environment.

In some embodiments, certain virtual sound sources may be associated with developer overrides for ambient, localized, or mobile sound reproduction of the virtual sound sources. A developer override is a rule whereby, when a virtual sound source, or class of virtual sound sources, meets certain criteria, the corresponding virtual sound source is assigned via a particular mapping to the available speakers in a predetermined manner. If a virtual sound source is subject to a developer override, then audio analysis and preprocessing application 232 does not analyze or preprocess the virtual sound source before transmitting the virtual sound source to audio mapping application 234 for mapping.

Audio analysis and preprocessing application 232 may perform frequency analysis to determine suitability for spatialization. If a virtual sound source includes low frequencies, then audio analysis and preprocessing application 232 may render the virtual sound source in a non-spatialized manner. Audio mapping application 234 then maps the virtual sound source to one or more subwoofers and/or equally to all loudspeakers 120. If a virtual sound source includes midrange to high frequencies, then audio analysis and preprocessing application 232 renders the virtual sound source in a spatialized manner. Audio mapping application 234 then maps the virtual sound source to the speaker or speakers that most closely correspond to the location, direction, and/or orientation of the virtual sound source. In general, low frequency, midrange frequency, and high frequency may be defined in any technically feasible manner as non-overlapping and/or overlapping frequency ranges. In one non-limiting example, low frequency could be defined as frequencies in the range of 20 Hertz (Hz) and 200 Hz, midrange frequency could be defined as frequencies in the range of 200 Hz and 5,000 Hz, and high frequency could be defined as frequencies in the range of 5,000 Hz and 20,000 Hz.

In some embodiments, audio analysis and preprocessing application 232 may generate a priority list for sound source mapping. In such embodiments, audio analysis and preprocessing application 232 may prioritize the mapping or assignment of certain virtual sound sources or certain passbands related to virtual sound sources before performing the mapping or assignment of lower priority virtual sound sources or passhands.

In some embodiments, audio analysis and preprocessing application 232 may map separate multiple overlapping sounds present in a single audio stream. Additionally or alternatively, audio analysis and preprocessing application 232 may map several overlapping components as a single sound in a single audio stream, prior to analyzing the overlapping components separately.

Further, audio analysis and preprocessing application 232 may analyze additional properties of virtual sound sources that influence how audio analysis and preprocessing application 232 and audio mapping application 234 render the virtual sound sources. For example, audio analysis and preprocessing application 232 could analyze the location of the virtual sound source in the XR environment. Additionally or alternatively, audio analysis and preprocessing application 232 could analyze the distance between the virtual sound source and acoustically reflective surfaces, such as virtual sound reflectors, and/or acoustically absorptive surfaces, such as virtual sound absorbers, within the XR environment. Additionally or alternatively, audio analysis and preprocessing application 232 could analyze the amplitude or volume of the sound generated by the virtual sound source. Additionally or alternatively, audio analysis and preprocessing application 232 could analyze the shortest straight-line path from the virtual sound source to the user, as the virtual sound source and user are represented in the XR environment. Additionally or alternatively, audio analysis and preprocessing application 232 could analyze the reverberant properties of virtual surfaces in the XR environment that are located near the virtual sound source. Additionally or alternatively, audio analysis and preprocessing application 232 could analyze the masking properties of nearby virtual objects in the XR environment.

In some embodiments, audio analysis and preprocessing application 232 may analyze the audio interaction of virtual sound sources that are proximal to one another in the audio scene. For example, audio analysis and preprocessing application 232 may determine that virtual sound sources that are located near one another may mask one another. In such embodiments, rather than forwarding potentially masked sounds to the audio mapping application 234, audio analysis and preprocessing application 232 may suppress virtual sound sources that would otherwise be masked. In this manner, audio mapping application 234 does not consume processing resources to map virtual sound sources that are then masked by other virtual sound sources. To consider such audio interactions among virtual sound sources in the analysis, audio analysis and preprocessing application 232 may additionally analyze, without limitation, the distance from one virtual sound source to other virtual sound sources, the amplitude or volume of one virtual sound source relative to other virtual sound sources, and the spectral properties of the audio generated by a virtual sound source.

In operation, audio mapping application 234 analyzes the virtual sound sources received from audio analysis and preprocessing application 232 in order to determine the optimal assignment of virtual sound sources to physical speakers, including loudspeakers 120 and head-mounted speakers 130. In so doing, audio mapping application 234 performs two distinct processes, namely, a cost function process and an optimization process, as now described.

First, audio mapping application 234 performs a cost function process to calculate the cost of assigning virtual sound sources to physical speakers, such as loudspeakers 120 and head-mounted speakers 130. In performing the cost function process, audio mapping application 234 analyzes the ability of the user to localize a particular sound based on the psychoacoustic properties of the corresponding virtual sound source and the overall sound pressure level contributed by a particular virtual sound source, as compared to other virtual sound sources.

Audio mapping application 234 computes the cost function based on psychoacoustic properties of the virtual sound source that enable the user to successfully spatially localize the virtual sound source, including, without limitation, the frequency of the virtual sound source for monaural spectral cues), the amplitude or volume of the virtual sound source (e.g. for inter-aural level differences), and a sound propagation model related to the virtual sound source.

In some embodiments, when analyzing the ability to localize a given source, audio mapping application 234 may additionally analyze the presence of other virtual sound sources in the virtual space, including, without limitation, overlap of frequency distributions for multiple virtual sound sources, interfering noise, background noise, and multi-source simplification, such as W-disjoint orthogonality methods (WDO). Further, audio mapping application 234 analyzes other properties of a virtual sound source that may depend on other virtual geospatial and acoustic variables, including, without limitation, the angle of the virtual sound source to the user in the XR environment, the distance of the virtual sound source to the user in the XR environment, the amplitude or volume of the virtual sound source to the user in the XR environment, and the type of virtual sound source, i.e., ambient, localized, or mobile. In some embodiments, the cost function may also be based on the frequency response and sensitivity of one or more loudspeakers 120 and/or head-mounted speakers 130.

In some embodiments, audio mapping application 234 may map 'k' virtual sound sources to physical speakers by generating a vector of speaker assignments 's' where the length of 's' corresponds to 'k.' The indices of vector 's' correspond to the index of virtual sound source where $1 \leq i \leq k$. The values of '$s_i$' correspond to an assignment of the virtual sound source to a speaker of the speaker system, where $1 \leq s_i \leq 1$.

In some embodiments, audio mapping application 234 may calculate a cost function c(i,j) that quantifies the cost of reproducing virtual sound source 'i' on speaker 'j' according to Equation 1 below:

$$C(i,j) = A(i,j)F(i) \quad (1)$$

where A(i,j) is the absolute distance between the angle of virtual sound source T and physical speaker 'j' with respect to the user, and F(i) is a frequency bias function that prioritizes spatialization of sound sources with a higher frequency.

Further, audio mapping application 234 may calculate D according to Equation 2 below:

$$A(i,j) = \alpha |\gamma_i - \delta_i| \quad (2)$$

where γ is a vector that includes the angular offset in virtual space for all virtual sound sources and δ is a vector that includes the angular offset of all physical speakers.

As disclosed above, F(i) is a frequency bias function that prioritizes spatialization of sound sources with a higher frequency, since higher frequency sound sources are typically perceived as more directional relative to lower frequency sound sources. Therefore, the computation of F(i) ensures that sound sources with predominantly high frequencies are weighted higher than sound sources with predominantly low frequencies. Audio mapping application 234 may calculate F(i) according to Equation 3 below:

$$F(i) = -\frac{k}{\log(\omega_i)} \quad (3)$$

where $\omega_i$ is the dominant audio frequency of virtual sound source i. For example, audio mapping application 234 could determine the value of $\omega_i$ based on a maximum energy analysis of the Fourier spectrum of sound source i.

The cost function process described above is one exemplary technique for determining the relative cost of assigning virtual sound sources to one or more physical speakers. Any other technically feasible approach for determining the relative cost of assigning virtual sound sources to one or more physical speakers is contemplated within the scope of the present disclosure.

Second, after performing the cost function process, audio mapping application 234 performs an optimization process. Audio mapping application 234 performs the optimization process by employing the cost function to determine the optimal mapping of virtual sound sources to physical speakers, including loudspeakers 120 and head-mounted speakers 130. By performing the optimization process, audio mapping application 234 determines an assignment of virtual sound sources to physical speakers such that the cost function is minimized under that assignment.

Audio mapping application 234 may perform the optimization process via any technically feasible technique depending on the nature of the cost function, including, without limitation, least squares optimization, convex optimization, and simulated annealing optimization. In addition, because the primary goal of the audio processing system 104 is to assign a set of virtual sound sources to a set of fixed speakers, combinatorial optimization approaches may be particularly applicable. Given the formulation of the cost function as described in conjunction with Equations 1-3, the Hungarian algorithm is an applicable technique for determining the optimal assignment of virtual sound sources to physical speakers.

Audio mapping application 234 performs the Hungarian algorithm by generating a cost matrix that assigns the cost of playback for each virtual sound source onto each of the physical speakers in the XR environment, using the cost function defined by Equations 1-3 above. Via the Hungarian algorithm, audio mapping application 234 computes the optimal assignment of 'k' virtual sound sources across 'l' speakers as well as the cost of each assignment. One possible cost matrix comprising 'k' virtual sound sources and physical speakers may be structured as shown in Table 1 below:

|  | Speaker 1 | Speaker 2 | ... | Speaker l |
|---|---|---|---|---|
| Virtual sound source 1 | $c_{(1,1)}$ | $c_{(1,2)}$ | ... | $c_{(1,l)}$ |
| Virtual sound source 2 | $c_{(2,1)}$ | $c_{(2,2)}$ | ... | $c_{(2,l)}$ |
| ... | ... | ... | ... | ... |
| Virtual sound source k | $c_{(k,1)}$ | $c_{(k,2)}$ | ... | $c_{(k,l)}$ |

The optimization process described above is one exemplary technique for optimally assigning virtual sound sources to one or more physical speakers. Any other technically feasible approach for optimally assigning virtual sound sources to one or more physical speakers is contemplated within the scope of the present disclosure.

Alternative embodiments are now described where loudspeakers 120 are employed in conjunction with conventional head-mounted speakers 130, and where loudspeakers 120 are employed in conjunction with head-mounted speakers 130 that have an audio transparency function.

In some embodiments, audio processing system 104 may leverage loudspeakers 120 in conjunction with conventional head-mounted speakers 130 to generate an audio scene. Such an audio scene may be optimal and more realistic relative to an audio scene generated for loudspeakers 120 alone. In general, XR system 102 may track the location of the head-mounted speakers 130 as the user moves, along with head-mounted speakers 130, within the physical environment. XR system 102 may transmit the location of the head-mounted speakers 130 to the audio processing system 104. In these embodiments, audio processing system 104 may prioritize mapping to the head-mounted speakers 130 as the primary speakers. Audio processing system 104 may leverage the loudspeakers 120 in order to create a more immersive and realistic audio scene by mapping relatively ambient, atmospheric, and distant sounds into the loudspeakers 120. In a multiuser XR environment, audio processing system 104 may deliver audio content intended for only a single user through the head-mounted speakers 130 associated with the single user. For example, in a game where two users are competing against each other and receiving different instructions, the audio processing system 104 could deliver user-specific narration to only the head-mounted speakers 130 associated with the intended user.

Audio processing system 104 could deliver environmental and audio sounds to the loudspeakers 130.

In addition, audio processing system 104 may further optimize the mapping based on the type of head-mounted speakers 130, such as open-back headphones, closed-back headphones, and so on. For example, if the user is wearing a pair of open-back headphones, audio processing system 104 may map more of the audio to the loudspeakers 130 relative to closed-back headphones because the user may bear more of the audio generated by the loudspeakers 130.

In some embodiments, audio processing system 104 may leverage loudspeakers 120 in conjunction with head-mounted speakers 130 that have an audio transparency function to generate an audio scene. Such an audio scene may be optimal and more realistic relative to either an audio scene generated for loudspeakers 120 alone or to an audio scene generated for loudspeakers 120 in conjunction with conventional head-mounted speakers 130. Head-mounted speakers 130 that are equipped with an audio transparency function include external microphones that are mounted on the head-mounted speakers 130. The external microphones sample the audio near the head-mounted speakers 130 and convert the sampled audio into an audio signal. The head-mounted speakers 130 include a mixer that mixes the audio signal from the microphones with the audio signal received from the audio processing system 104. In this manner, audio processing system 104 may modify the audio signal transmitted to the head-mounted speakers 130 to account for the audio signal from the microphones. As a result, audio processing system 104 may generate an audio scene that is more immersive and realistic relative to a system that employs head-mounted speakers 130 without an audio transparency function.

Furthermore, audio processing system 104 may control the amount of audio being passed from the microphones to the head-mounted speakers 130. In so doing, audio processing system 104 may control the level of the audio signal from the microphones relative to the audio signal received from the audio processing system 104. In this manner, audio processing system 104 may adjust the relative levels of the two audio signals to generate an audio scene with improved depth and realism. In one example, a user could be playing a first-person shooter when a virtual gun is fired by another human user or computer-generated player, and a virtual bullet fired from the virtual gun is heading towards the user. The user then enables a time-warp function within the game in order to dodge the virtual bullet. When the gun is first fired, audio processing system 104 maps the sound of the virtual bullet so that the sound is emitted from a combination of two of the loudspeakers 120 in the front of the physical room in which the user is playing. Further, audio processing system 104 adjusts the audio mix on the head-mounted speakers 130 so that audio transparency is fully on. As a result, the user hears the sound from the loudspeakers 130. As the virtual bullet approaches the user, audio processing system 104 adjusts the audio mix on the head-mounted speakers 130 to decrease the sound transmitted by the audio transparency function and increase the sound received from audio processing system 104. In this manner, the user hears the sound of the virtual bullet from audio processing system 104, providing a more realistic and close sound as the virtual bullet travels near the user.

Figure 3:
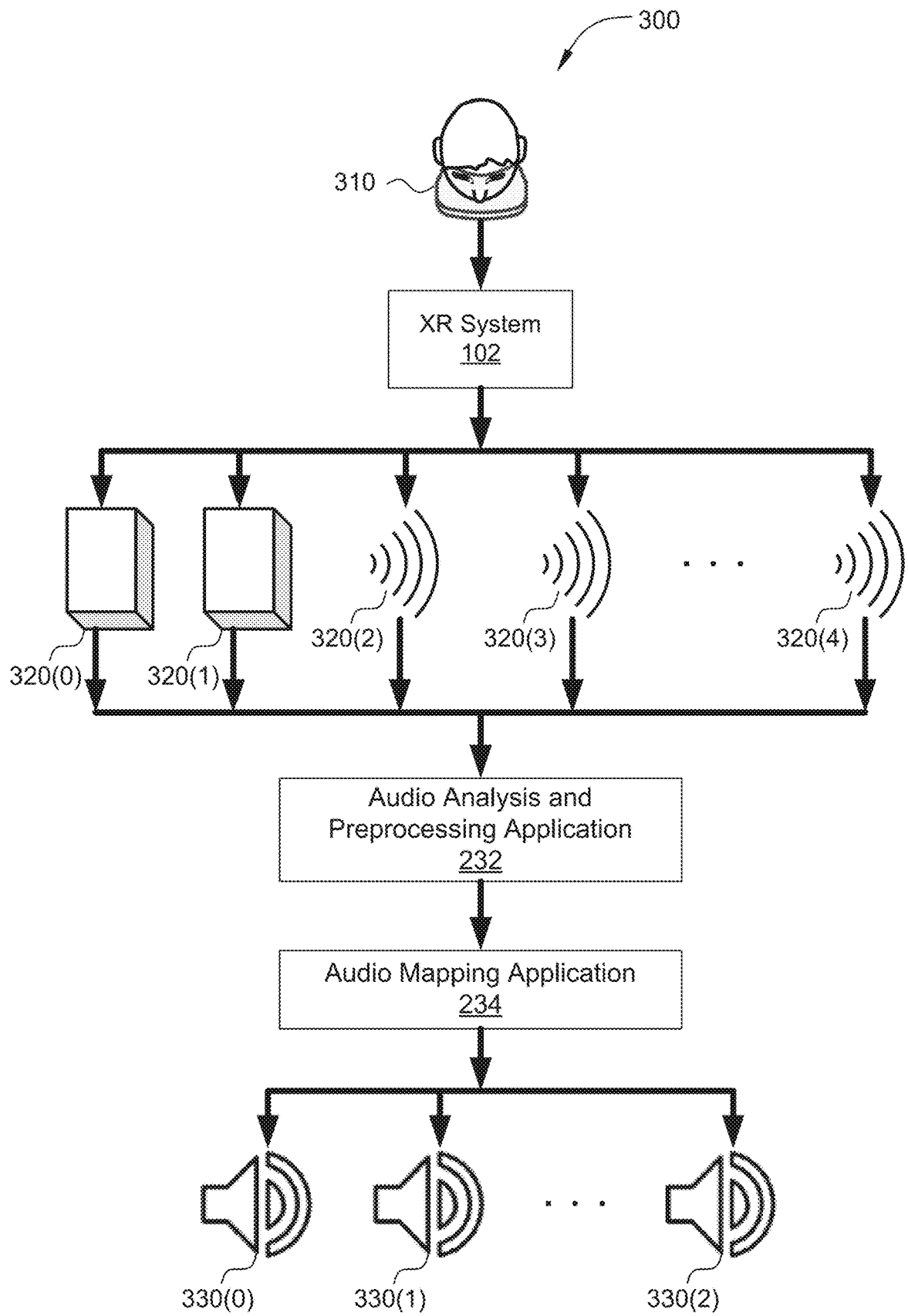
FIG. 3 is a conceptual diagram that illustrates how audio associated with the system of FIG. 1 is mapped to a set of speakers, according to various embodiments

FIG. 3 is a conceptual diagram 300 that illustrates how audio associated with the system 100 of FIG. 1 is mapped to a set of speakers, according to various embodiments. As shown, the conceptual diagram 300 includes a user 310, an XR system 102, virtual sound sources 320(0)-320(4), an audio analysis and preprocessing application 232, an audio mapping application 234, and loudspeakers 330(0)-330(2). XR system 102, audio analysis and preprocessing application 232, audio mapping application 234, and speakers 330(0)-330(2) function substantially the same as described in conjunction with FIGS. 1-2 except as further described below.

As shown, a user 310 wears an XR headset that is coupled to an XR system 102. The XR system 102 may be embedded within the XR headset or may be a separate system that is communicatively coupled to the XR headset over a wired or wireless communications link. The XR system 102 generates one or more virtual sound sources 320(0)-320(4) based on certain virtual objects and audio effects generated by the XR system 102. Further, the virtual sound sources 320(0)-320(4) are based on actions performed by the user 310, including, without limitation, moving within the XR environment, moving in the physical real-world environment, and manipulating various controls on a controller device (not explicitly shown). Virtual sound sources 320(0)-320(4) include any technically feasible combination of virtual sound emitters, virtual sound absorbers, and virtual sound reflectors. For example, virtual sound sources 320(2)-320(4) could be virtual sound emitters that generate one or more sounds. Each of virtual sound sources 320(2)-320(4) could be an ambient, localized, or mobile virtual sound emitter, in any, technically feasible combination. Each of virtual sound sources 320(0)-320(1) could be a virtual sound absorber that absorbs incoming sound, a virtual sound reflector that reflects incoming sound, or a virtual sound source that absorbs a first portion of incoming sound and reflects a second portion of incoming sound.

Information regarding the virtual sound sources 320(0)-320(4) is transmitted to audio analysis and preprocessing application 232. Audio analysis and preprocessing application 232 performs frequency analysis to determine suitability for spatialization. If a virtual sound source 320 includes low frequencies, then audio analysis and preprocessing application 232 renders the virtual sound source 320 in a non-spatialized manner. If a virtual sound source 320 includes midrange to high frequencies, then audio analysis and preprocessing application 232 renders the virtual sound source 320 in a spatialized manner. After performing the frequency analysis on the preprocessed virtual sound sources 320 to audio mapping application 234.

Audio mapping application maps each of the preprocessed virtual sound sources 320 to one or more speakers 330(0)-330(2) based on the frequency analysis information generated by audio analysis and preprocessing application 232. If a virtual sound source includes low frequencies, then audio mapping application 234 maps the virtual sound source to one or more subwoofers and/or equally to multiple speakers 330(0)-330(2). If a virtual sound source includes midrange to high frequencies, then audio mapping application 234 then maps the virtual sound source to the speaker or speakers that most closely correspond to the location, direction, and/or orientation of the virtual sound source. Audio mapping application 234 transmits the sound associated with each of the virtual sound sources 320(0)-320(4) to the appropriate speakers 330(0)-330(2).

Various scenarios for the arrangement and mapping of virtual sound sources to speakers are now described.

Figure 4A:
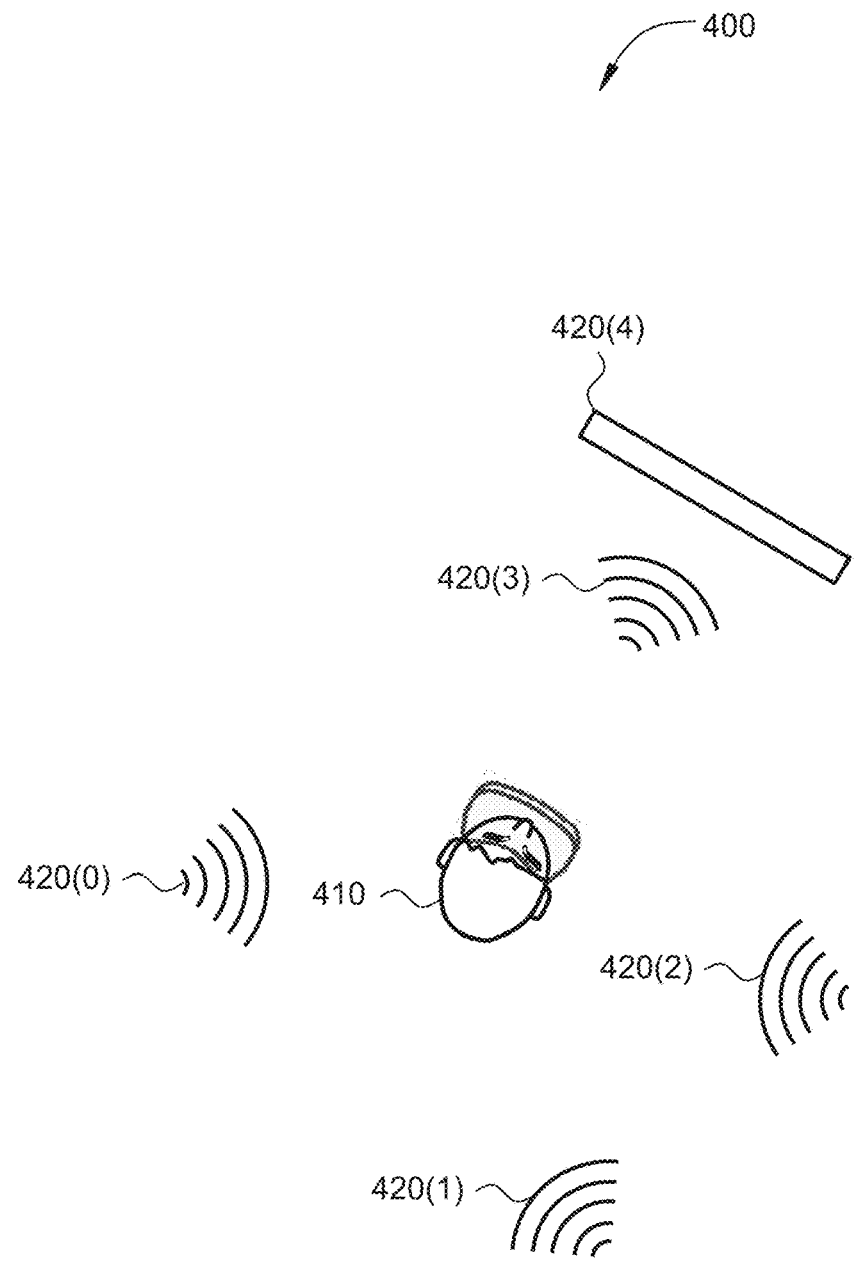
FIGS. 4A-4B illustrate an example arrangement of virtual sound sources generated by the system of FIG. 1 relative to a set of loudspeakers, according to various embodiments.
Figure 4B:
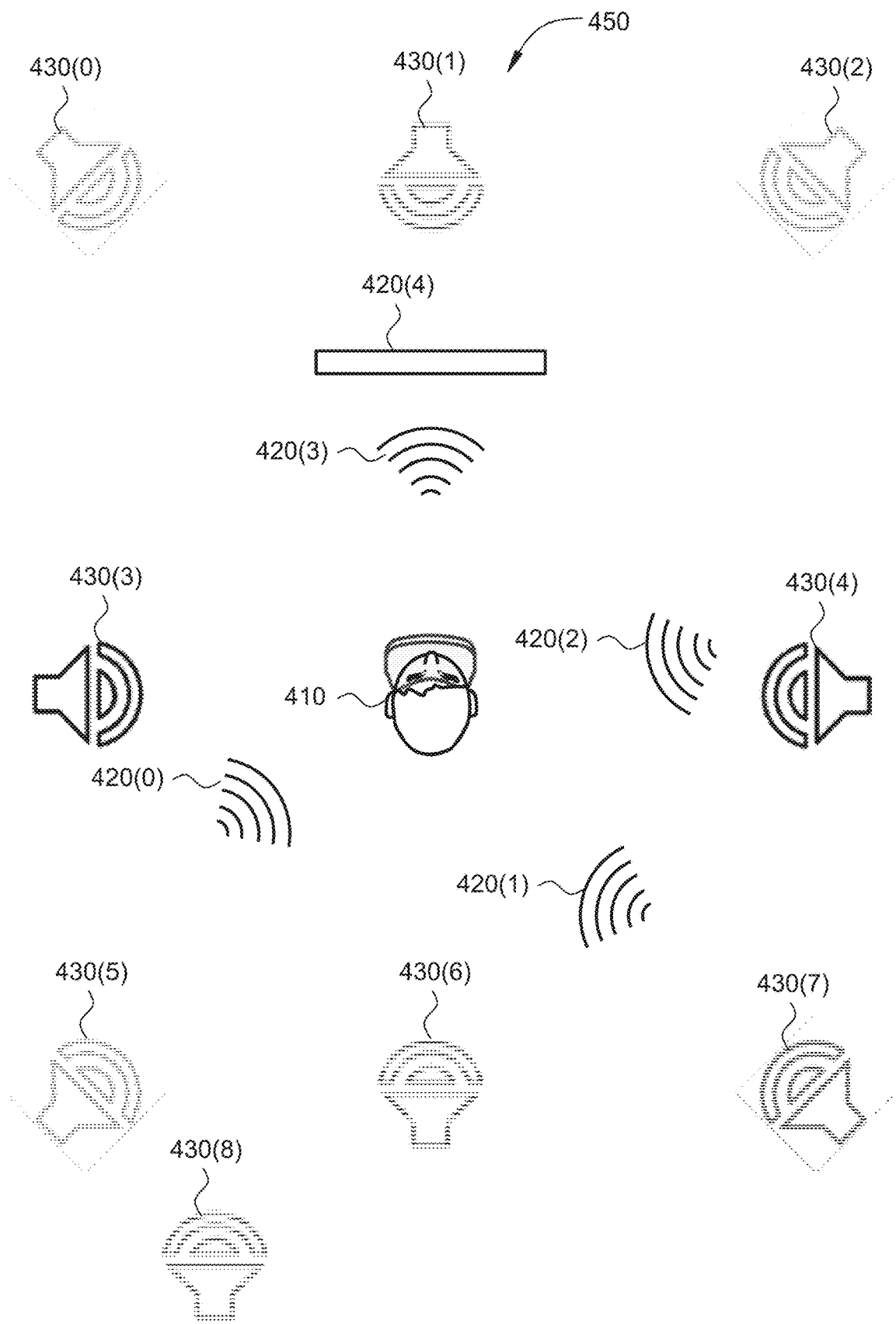

FIGS. 4A-4B illustrate an example arrangement of virtual sound sources 420(0)-420(4) generated by the system 100 of FIG. 1 relative to a set of loudspeakers 430(0)-430(8), according to various embodiments. Virtual sound sources 420(0)-420(4) and loudspeakers 430(0)-430(8) function substantially the same as described in conjunction with FIGS. 1-3 except as further described below.

As shown in the example arrangement 400 of FIG. 4A, a user 410 is surrounded by five virtual sound sources 420(0)-420(4) generated by XR system 102 of FIG. 1. Virtual sound source 420(0) is a virtual sound emitter that is substantially directed at the user 410. As a result, the user 410 hears all or most of the sound generated by virtual sound source 420(0). Virtual sound sources 420(1) and 420(2) are virtual sound emitters that are obliquely directed at the user 410. As a result, the user 410 hears a reduced portion of the sound generated by virtual sound sources 420(1) and 420(2). Virtual sound source 420(3) is a virtual sound emitter that is substantially directed away from the user 410. As a result, the user 410 directly hears little or none of the sound generated by virtual sound source 420(3). In addition, virtual sound source 420(3) is substantially directed towards virtual sound source 420(4).

Virtual sound source 420(4) may be a virtual sound absorber, a virtual sound reflector, or a virtual sound source that acts as both a virtual sound absorber and a virtual sound reflector. If virtual sound source 420(4) is a virtual sound absorber, then virtual sound source 420(4) absorbs substantially all of the sound generated by virtual sound source 420(3). As a result, the user 410 hears little or none of the sound generated by virtual sound source 420(3). If virtual sound source 420(4) is a virtual sound reflector, then virtual sound source 420(4) reflects substantially all of the sound generated by virtual sound source 420(3). As a result, the user 410 hears all or most of the sound generated by virtual sound source 420(3). If virtual sound source 420(4) acts as both a virtual sound absorber and a virtual sound reflector, then virtual sound source 420(4) absorbs a first portion of the sound generated by virtual sound source 420(3) and reflects a second portion of the sound generated by virtual sound source 420(3). As a result, the user 410 hears little or none of the first portion of the sound generated by virtual sound source 420(3) and hears all or most of the second portion of the sound generated by virtual sound source 420(3).

In some embodiments, all of the virtual sound sources 420(0)-420(4) may be perceived as being located relative to the direction of the head of the user 410. In such embodiments, the virtual sound sources may appear to rotate with the user 410 when the user 410 rotates his or her head and or body rather than remain in a static location, direction, and/or orientation. Accordingly, virtual sound sources 420(0)-420(3) may be localized virtual sound emitters that are perceived by the user 410 as more or less static sound sources that remain in a fixed location, direction, and/or orientation relative to the user 410. Similarly, virtual sound source 420(4) may be a virtual sound absorber and/or virtual sound reflector that remains in a fixed location, direction, and/or orientation relative to the user 410.

As shown in the example arrangement 450 FIG. 4B, the user 410 is surrounded by the same five virtual sound sources 420(0)-420(4) illustrated in FIG. 4A. Even though the user 410 is looking in a different direction in FIG. 4B relative to FIG. 4A, the virtual sound sources 420(0)-420(4) maintain the same relative location, direction, and/or orientation relative to the user 410. Audio processing system 104 maps each of the virtual sound sources 420(0)-420(4) to one or more of the loudspeakers 430(0)-430(8). Loudspeakers 430(0)-430(7) are directional speakers. Audio processing system 104 may map midrange to high frequency sounds from localized and/or mobile virtual sound sources 420 to loudspeakers 430(0)-430(7). Loudspeaker 430(8) is a non-directional speaker, such as a subwoofer. Audio processing system 104 may map ambient virtual sound sources 420 as well as low frequency sounds from localized and/or mobile virtual sound sources 420 to loudspeaker 430(8). Additionally or alternatively, audio processing system 104 may map ambient virtual sound sources 420 as well as low frequency sounds from localized and/or mobile virtual sound sources 420 more or less equally to loudspeakers 430(0)-430(7).

Audio processing system 104 maps sounds to loudspeakers 430(0)-430(7) based on the relative location, direction, and/or orientation of the corresponding virtual sound sources 420(0)-420(4). In that regard, audio processing system 104 maps sound generated by virtual sound source 420(0) primarily to loudspeaker 430(3). Further, audio processing system 104 may map a portion of the sound generated by virtual sound source 420(0) to one or more additional loudspeakers such as loudspeaker 430(5). Audio processing system 104 maps sound generated by virtual sound source 420(1) primarily to loudspeaker 430(7). Further, audio processing system 104 may map a portion of the sound generated by virtual sound source 420(1) to one or more additional loudspeakers such as loudspeakers 430(4) and 430(6). Audio processing system 104 maps sound generated by virtual sound source 420(2) primarily to loudspeaker 430(4). Further, audio processing system 104 may map a portion of the sound generated by virtual sound source 420(2) to one or more additional loudspeakers such as loudspeaker 430(2). Audio processing system 104 maps sound generated by virtual sound source 420(3) along with the absorptive and reflective effects of virtual sound source 420(4) of primarily to loudspeaker 430(1). Further, audio processing system 104 may map a portion of the sound generated by virtual sound source 420(3) along with the absorptive and/or reflective effects of virtual sound source 420(4) to one or more additional loudspeakers such as loudspeakers 430(0) and 430(2).

In one potential scenario, the user 410 is a player of VR action games. In contrast to using headphones for playback of game audio, the user 410 plays back the game audio via a surround sound system exemplified by loudspeakers 430(0)-430(8). Audio processing system 104 renders the game audio to loudspeakers 430(0)-430(8) in a manner that improves the degree of immersion that the user 410 experiences while gaming. Audio processing system 104 automatically detects when the user's 410 orientation changes in the XR environment (for instance, when the user 410 is driving a car and makes a left turn), and reassigns virtual sound sources 420(0)-420(4) in the XR environment to different loudspeakers 430(0)-430(8). In order to maintain the audio rendering of the XR environment to be as realistic as possible. Audio processing system 104 tracks mobile virtual sound sources (e.g., attack helicopters, projectiles, vehicles, etc.), and automatically assigns loudspeakers 430(0)-430(8) to play back these virtual sound sources consistent with the virtual sound sources 420(0)-420(4) generated by the XR system 102.

Figure 5A:
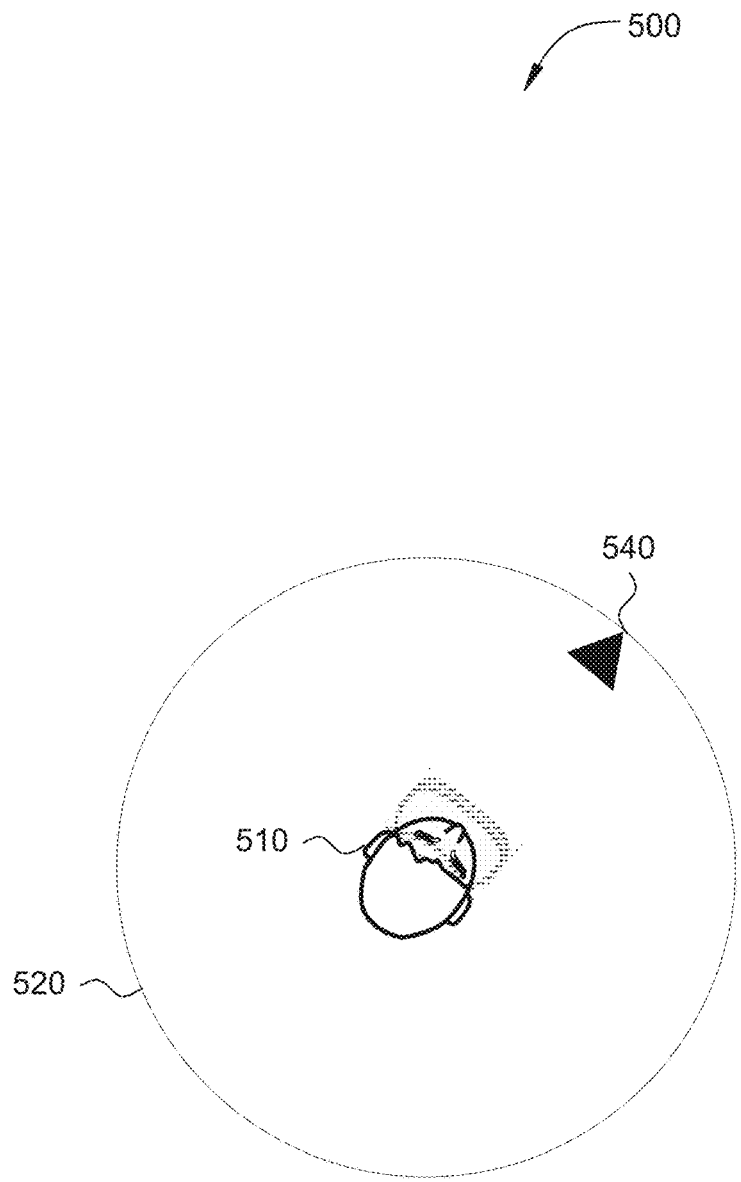
FIGS. 5A-5C illustrate an example arrangement of an audio panorama generated by the system of FIG. 1 relative to a set of loudspeakers, according to various embodiments.
Figure 5B:
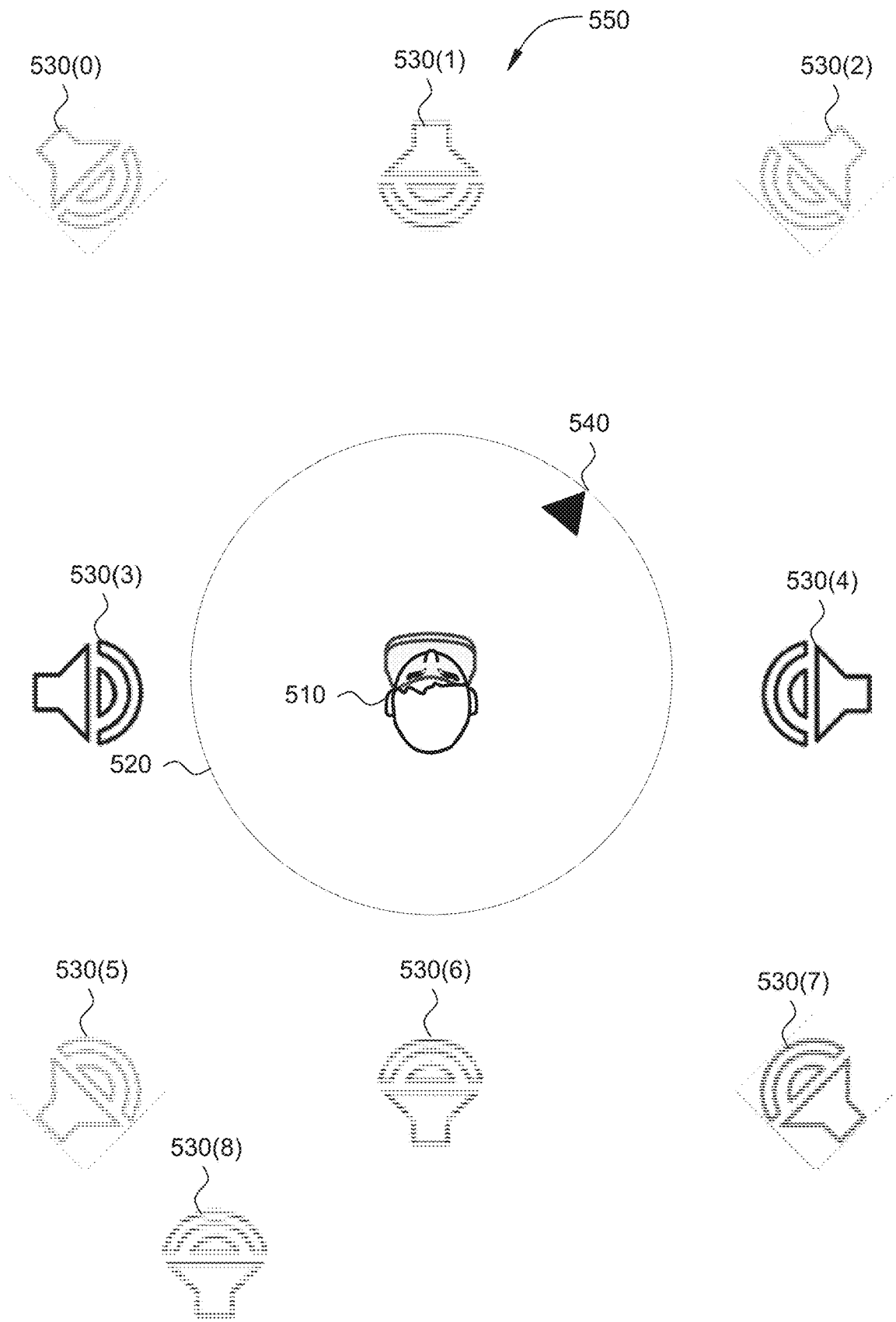
Figure 5C:
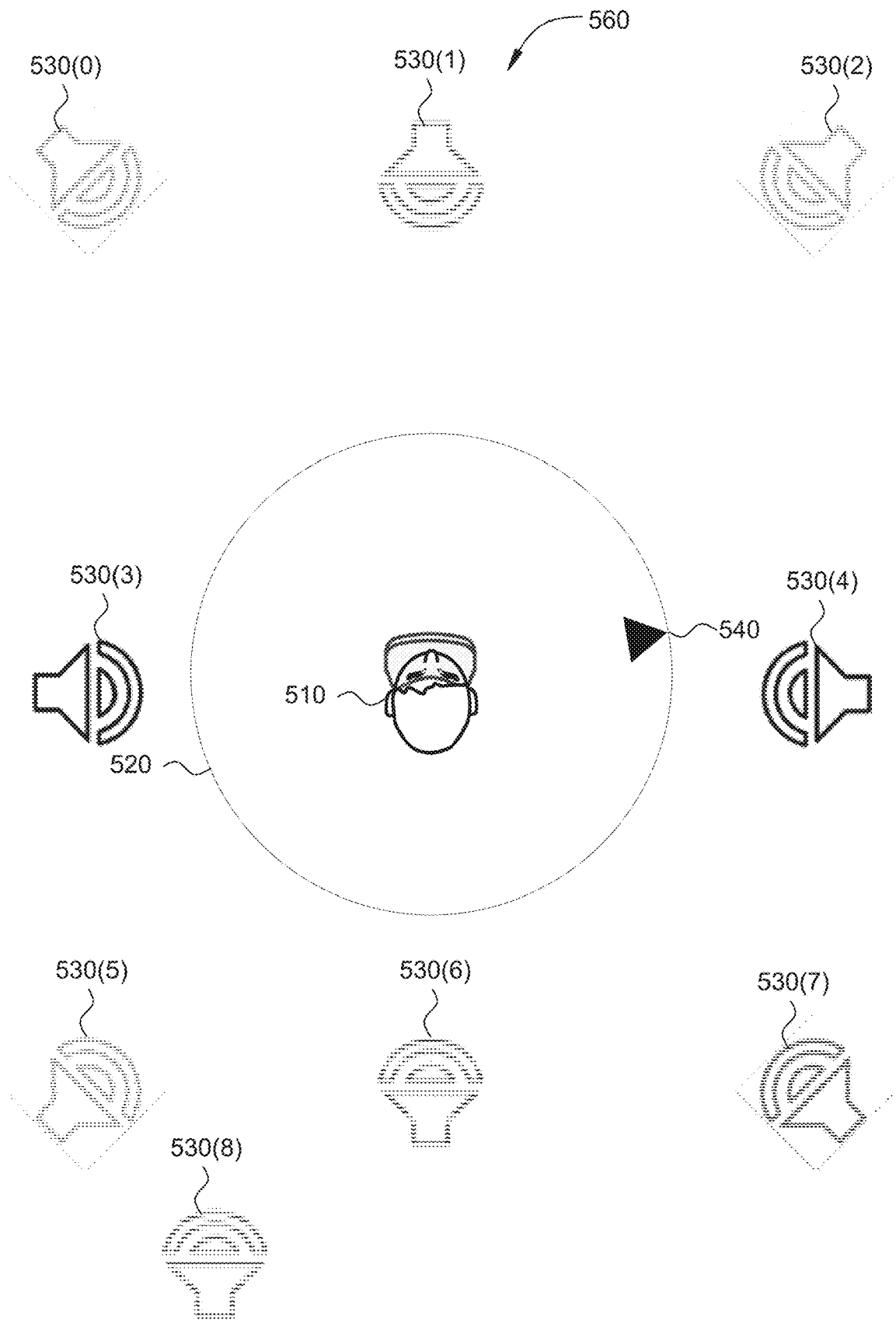

FIGS. 5A-5C illustrate an example arrangement of an audio panorama 520 generated by the system 100 of FIG. 1 relative to a set of loudspeakers 530(0)-530(8), according to various embodiments. Loudspeakers 530(0)-530(8) function substantially the same as described in conjunction with FIGS. 1-4B except as further described below.

As shown in the example arrangement 500 FIG. 5A, a user 510 is surrounded by a virtual audio panorama 520. In general, the audio panorama 520 may function as a virtual sound source that forms a 360° circle of sound around the user 510. Further, the audio panorama 530 may have a vertical dimensionality so that the audio panorama forms a virtual dome (or sphere) of sound that surrounds the user 510 in both the horizontal dimension and the vertical dimension. The audio panorama 520 has the effect of generating sounds in a continuous manner around and above the user 510. As shown, the audio panorama 520 includes a focus indicator 540 that identifies the direction that the user is facing. The audio panorama 520 may rotate or remain fixed as the user rotates his or her head to face a different direction, depending on one or more characteristics of the audio panorama 520.

In one potential scenario, the user 510 is a mountain-biker. The user 510 records his or her mountain-bike rides via a helmet that is equipped with a 360° camera mounted on his or her helmet. The camera includes a directional microphone system that record a spatial audio panorama 520 based on the direction that the user 510 is looking at any given time. Later, the user 510 views a previously recorded mountain-bike ride on XR system 102 and audio processing system 104.

While viewing the panoramic video content via the XR system 102 associated with the XR headset of the user 510, audio processing system 104 tracks the location, direction, and/or orientation of the user 510 in the physical environment relative to the focus indicator 540 of the original audio panorama 520. Based on the location, direction, and/or orientation of the user 510 in the physical environment relative to the focus indicator 540, audio processing system 104 automatically adjusts the location, direction, and/or orientation of the audio panorama 510 as needed according to the movements of the user 510 as well as the movements recorded in the original mountain-bike ride, leading to a more realistic and vivid XR experience when viewing the previously recorded mountain-bike ride.

In a first example, the sound represented by the audio panorama 520 could be an ambient virtual sound source. One such ambient virtual sound source could be rainfall. As further described herein, an ambient virtual sound source is a virtual sound source that does not have an apparent location, direction, or orientation. Therefore, the ambient virtual sound source seems to come from everywhere in the audio panorama 520, rather than from a particular location, direction, and/or orientation, in such cases, the audio panorama 520 would not rotate as the user 510 rotates his or her head.

In a second example, the user 510 could play back a virtual mountain-bike ride through a forest that the user 510 recorded during an actual mountain-bike ride. The user 510 could be riding his or her bicycle in a straight line while recording the original mountain-bike ride. Subsequently, when playing back the previously recorded virtual mountain-bike ride, the user could turn his or her head to the left, while the virtual bicycle continues to go straight in the same direction. In such cases, if the environmental sounds represented by the audio panorama 520 are playing back via physical loudspeakers rather than via head-mounted speakers, the audio panorama 520 would not rotate. Therefore, audio processing system 104 would not adjust the rendered sound being transmitted to the physical loudspeakers. In one specific example, the rustling of leaves and the pecking of a woodpecker on a single tree could seem to be coining from a virtual tree that is directly to the left of the user 510. If, during playback of the mountain-hike ride, the user 510 turns his or her head to the left to face the virtual tree, the audio panorama 520 would not rotate, and the sound associated with the virtual tree would continue to be rendered to the same physical loudspeakers. Because the user 510 is now facing to the left, the sound associated with the virtual tree would seem to be in front of him or her.

In a third example, the user 510 could play back a virtual mountain-bike ride through a forest that the user 510 recorded during an actual mountain-bike ride. The user 510 could keep his or her head still during playback, but both the user 510 and the bicycle could be changing direction within the audio panorama 520 based on the previously-recorded mountain-bike ride. In such cases, XR system 102 would keep track of the direction of the bicycle, so the environmental sounds represented by the audio panorama 520 would rotate in the opposite direction by a substantially equal amount. In one specific example, while the user 510 was bicycling and originally recording the scene as an audio panorama 520, the user 510 could make a left turn with his or her bicycle. During the left turn, head of the user 510 would remain aligned with the bicycle. Subsequently, when the user 510 plays back this previously-recorded virtual mountain-bike ride, the user 510 could be experiencing the virtual mountain-bike ride while standing or sitting still without turning his or her head. During the left turn described above, the extended reality environment as represented by the video would appear to rotate to the right. In other words, the extended reality environment as represented by the video would counter-rotate to the right by a substantially equal amount as the original left turn amount. Therefore, if the user 510 made a 90° left turn, the extended reality environment as represented by the video would counter-rotate to the right by 90°. Similarly, the audio panorama 520 would also counter-rotate to the right by 90°, to maintain the proper orientation of the virtual sound sources represented by the audio panorama 520. As a result, the rustling of leaves and the pecking of a woodpecker on a single tree that is directly to the left of the user 510 prior to the left turn would seem to be in front of the user 510 after the left turn.

As shown in the example arrangement 550 FIG. 5B, the user 510 is surrounded by the same audio panorama 520 illustrated in FIG. 5A. Even though the user 510 is looking in a different direction in FIG. 5B relative to FIG. 5A, the audio panorama 520 does not rotate based on the movement of the user 510. In that regard, the focus indicator 540 of the audio panorama 520 remains in the same direction as shown in FIG. 5A. Audio processing system 104 continues to map the audio panorama 520 to loudspeakers 530(0)-530(8) based on frequency and based on the location, direction, and/or orientation of the focus indicator 540 of the audio panorama 520 relative to loudspeakers 530(0)-530(8). The scenario shown in FIG. 5B corresponds to the first example above where the virtual sound source represented by the audio panorama 520 is an ambient sound source. The scenario shown in FIG. 5B also corresponds to the second example above where the user 510 is riding his or her bicycle in a straight line while recording the original mountain-bike ride, but turns his or her head when subsequently playing back the previously recorded virtual mountain-bike ride.

As shown in the example arrangement 560 FIG. 5C, the user 510 is surrounded by the same audio panorama 520 illustrated in FIG. 5A. As shown, the user 510 is looking in a different direction in FIG. 5C relative to FIG. 5A, the audio panorama 520 counter-rotates in the opposite direction by a substantially equal amount as the movement of the user 510. In that regard, the focus indicator 540 of the audio panorama 520 moves in the opposite direction as the movement of the user 510. Audio processing system 104 maps the audio panorama 520 to loudspeakers 530(0)-530(8) based on frequency and based on the new location, direction, and/or orientation of the focus indicator 540 of the audio panorama 520 relative to loudspeakers 530(0)-530(8). The scenario shown in FIG. 5C corresponds to the third example above where the user 510 keeps his or her head still during playback, but both the user 510 and the bicycle are changing direction within the audio panorama 520 based on the previously-recorded mountain-bike ride.

Figure 6:
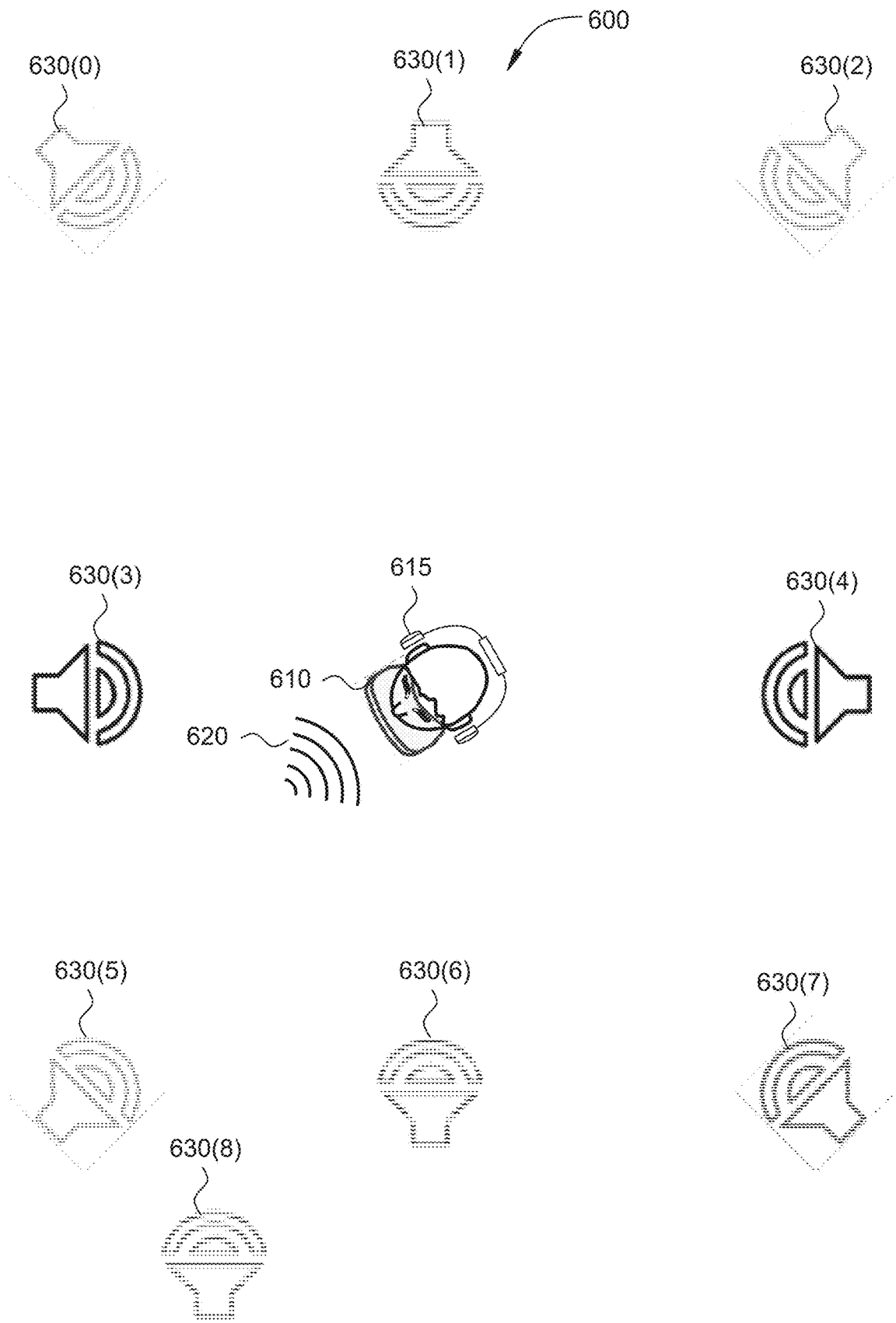
FIG. 6 illustrates an example arrangement of a virtual sound source generated by the system of FIG. 1 relative to a set of loudspeakers and a set of head-mounted speakers, according to various embodiments.

FIG. 6 illustrates an example arrangement 600 of a virtual sound source 620 generated by the system 100 of FIG. 1 relative to a set of loudspeakers 630(0)-630(8) and a set of head-mounted speakers 615, according to various embodiments. Virtual sound source 620 and loudspeakers 630(0)-630(8) function substantially the same as described in conjunction with FIGS. 1-5C except as further described below.

As shown, a user 610 is facing a virtual sound source 620. The user 610 is surrounded by loudspeakers 630(0)-630(8) and is wearing a set of head-mounted speakers 615. Because the user 610 is near virtual sound source 620, audio processing system 104 may map most or all of the midrange to high frequency sound emitted by virtual sound source 620 to headphones 615. Audio processing system 104 may map most or all of the low frequency sound emitted by virtual sound source 620 to loudspeaker 630(8). Additionally or alternatively, audio processing system 104 may map most or all of the low frequency sound emitted by virtual sound source 620 more or less equally to loudspeakers 630(0)-630(7). Further, audio processing system 104 may map additional ambient, localized, and mobile virtual sound sources (not explicitly shown) to one or more loudspeakers 630(0)-630(8), as further described herein.

In one potential scenario, the user 610 employs XR system 102 to complete virtual training exercises regarding how to diagnose and repair engines. XR system 102 generates an avatar of a tutor in the XR environment. XR system 102 further generates various virtual sound sources, such as virtual sound source 620, that generate sounds related to the running virtual engine. Audio processing system 104 generates sounds that the user 610 hears via one or more of the loudspeakers 630(0)-630(8) and the head-mounted speakers 615. Audio processing system 104 tracks the user 610 as the user 610 moves around the virtual engine in the XR environment. As the user 610 places his or her head closer to the virtual engine, audio processing system 104 routes the voice of the tutor to the head-mounted speakers 615. In this manner, audio processing system 104 may compensate for the fact that the voice of the tutor may be masked by the noise producing virtual sound sources related to the running virtual engine. Additionally or alternatively, audio processing system 104 may map the low frequency, rumbling sounds of the virtual engine to loudspeaker 630(8) or more or less equally to loudspeakers 630(0)-630(7). In this manner, the user 610 experiences these low frequency, rumbling sounds as ambient non-spatialized sound. Further, the user may experience a physical sensation from the loudspeakers 630(0)-630(8) that approximates the physical vibration of a running engine.

If the tutor wants to draw the attention of the user 610 to an engine component that generates a high-pitched whirring sound, then audio processing system 104 may map high-pitched whirring sound to one of the directional loudspeakers 630(0)-630(7) in the room. In this manner, the user 610 may experience the high-pitched sound as a directional sound, and may more easily locate the virtual engine component that is generating the sound.

Figure 7A:
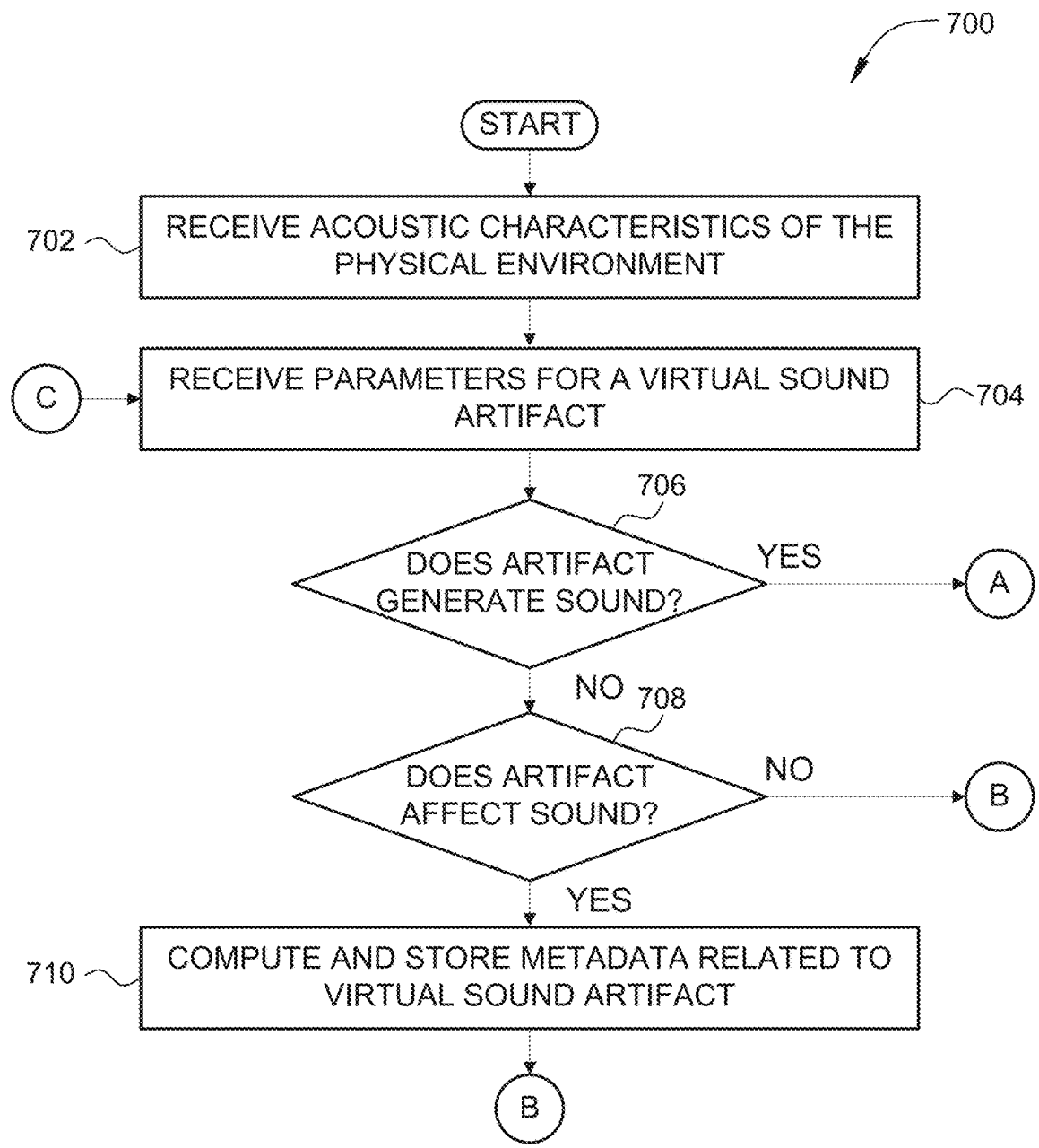
FIGS. 7A-7C set forth a flow diagram of method steps for generating an audio scene for an XR environment, according to various embodiments.
Figure 7B:
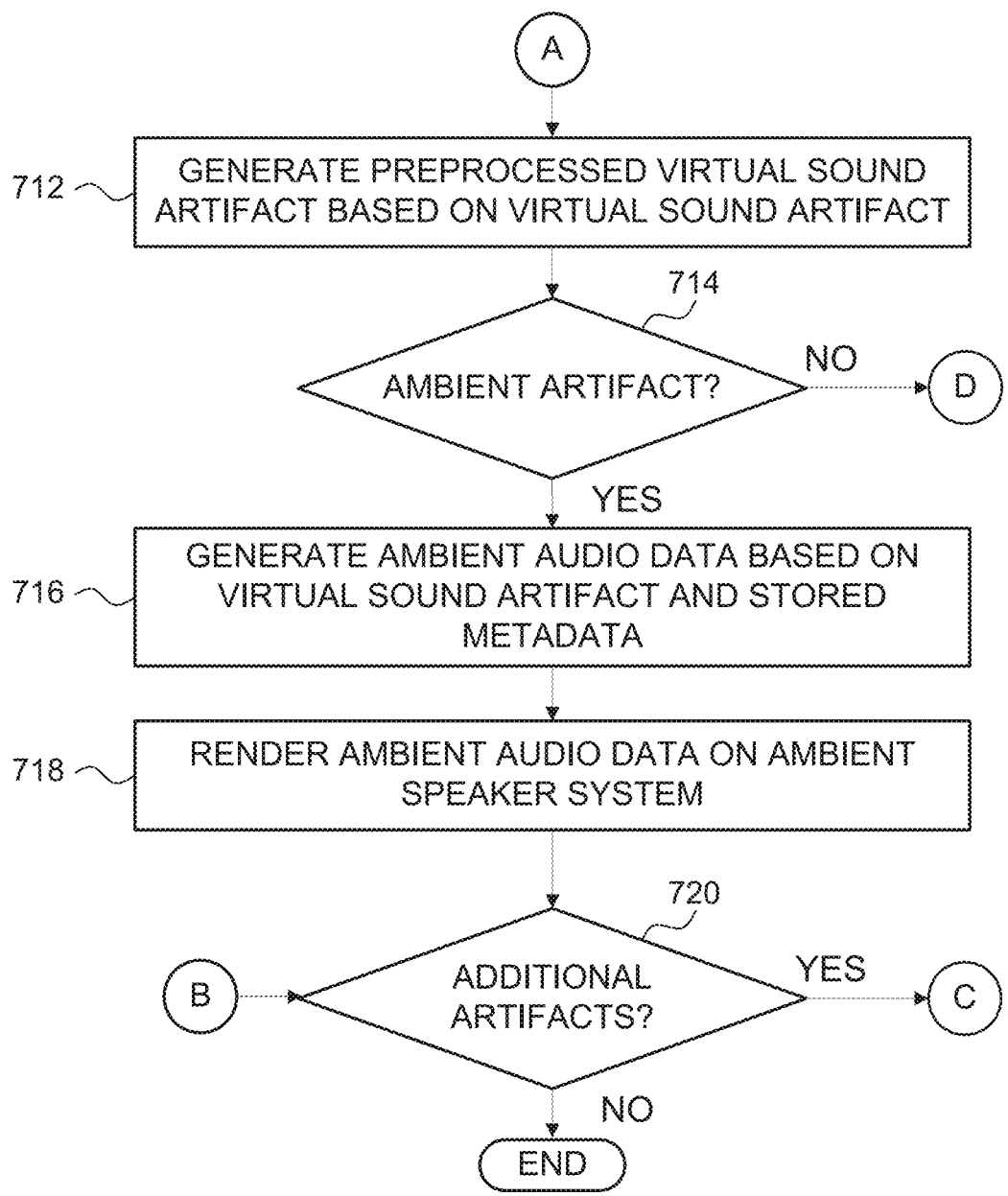
Figure 7C:
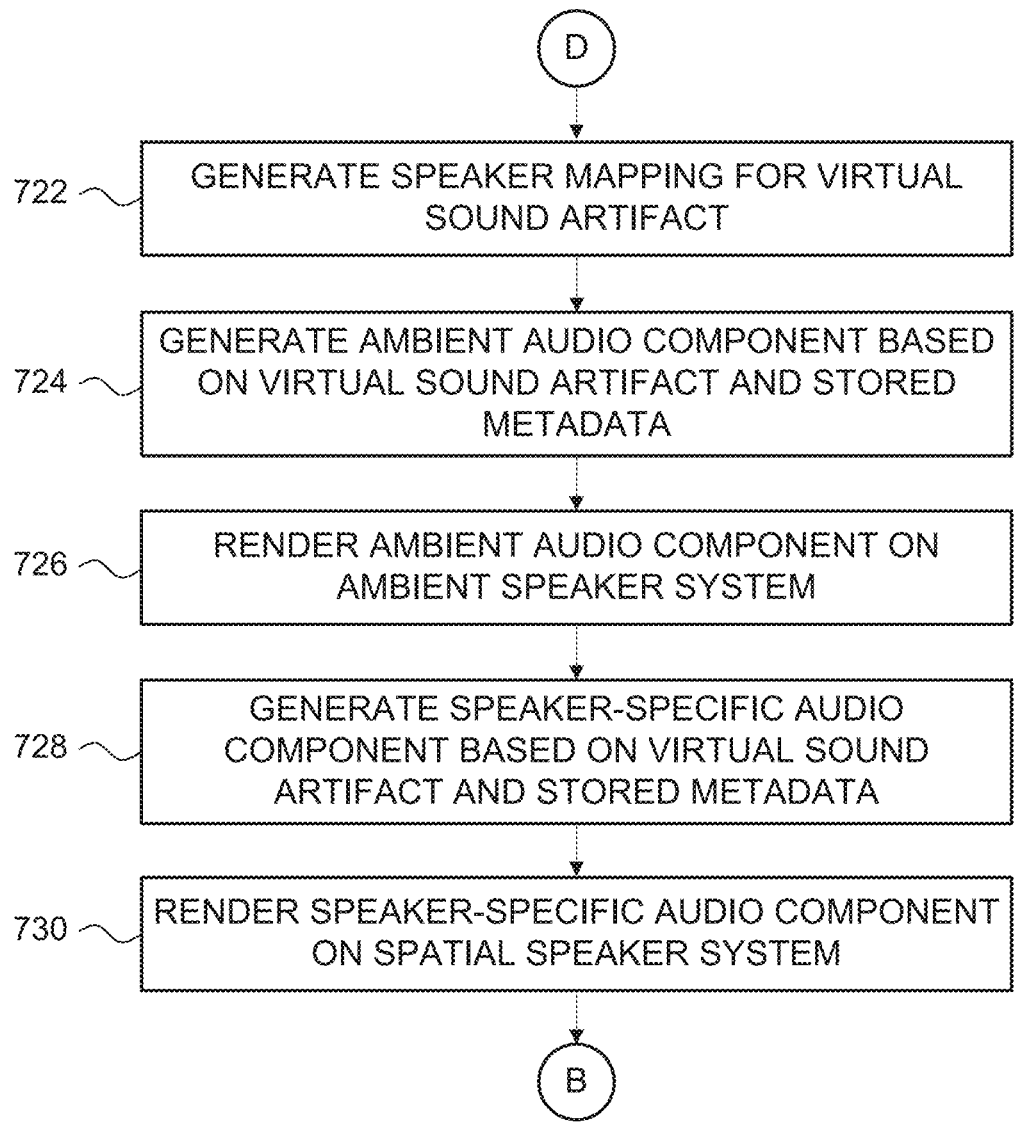

FIGS. 7A-7C set forth a flow diagram of method steps for generating an audio scene for an XR environment, according to various embodiments. Although the method steps are described in conjunction with the systems of FIGS. 1-6, persons skilled in the art will understand that any system configured to perform the method steps, in any order, is within the scope of the present disclosure.

As shown, a method 700 begins at step 702, where an audio processing system 104 receives acoustic characteristics of the loudspeakers 120 and of the physical environment. These acoustic characteristics may include, without limitation, speaker directivity, speaker frequency response characteristics, three-dimensional spatial location of the speakers, and physical environment frequency response characteristics.

At step 704, audio processing system 104 receives parameters for a virtual sound source. These parameters include the location, amplitude or volume, direction, and/or orientation of the virtual sound source. These parameters further include whether the virtual sound source is an ambient, localized, or mobile virtual sound source. These parameters further include whether the virtual sound source is a virtual sound emitter, a virtual sound absorber, or a virtual sound reflector. These parameters further include any other information that describes how the virtual sound source generates or affects sound in the XR environment.

At step 706, audio processing system 104 determines whether the virtual sound source generates sound in the XR environment. If the virtual sound source generates sound in the XR environment, then the method 700 proceeds to step 712, where audio processing system 104 generates one or more preprocessed virtual sound sources based on the incoming virtual sound source. The preprocessed virtual sound source includes information regarding the frequency spectrum of the virtual sound source. For example, the preprocessed virtual sound source includes information as to whether the virtual sound source includes any one or more of low, midrange, and high frequency sound components.

At step 714, audio processing system 104 determines whether the preprocessed virtual sound source is an ambient sound source. If the preprocessed virtual sound source is an ambient sound source, then the method 700 proceeds to step 716, where audio processing system 104 generates ambient audio data based on the preprocessed virtual sound source and on stored metadata. The stored metadata includes information related to acoustic characteristics of the loudspeakers 120 and of the physical environment. The stored metadata further includes information related to virtual sound sources that affect the audio in the XR environment, such as virtual sound absorbers and virtual sound reflectors. At step 718, audio processing system 104 outputs or renders the ambient sound components of the audio data via the ambient speaker system. In performing this step, audio processing system 104 may map the ambient audio data to one or more subwoofers. Additionally or alternatively, audio processing system 104 may map the ambient audio data map the virtual sound source equally to all directional loudspeakers 120.

At step 720, audio processing system 104 determines whether there are additional virtual sound sources to process. If there are additional virtual sound sources to process, then the method 700 proceeds to step 704, described above. If, on the other hand, there are no additional virtual sound sources to process, then the method 700 terminates.

Returning to step 714, if the preprocessed virtual sound source is not an ambient sound source, then the preprocessed virtual sound source is either a localized virtual sound source or a mobile virtual sound source. In such cases, the method 700 proceeds to step 722, where audio processing system 104 generates a speaker mapping for the virtual sound source. Audio processing system 104 generates the mapping based on the frequency components of the virtual sound source. Low frequency sound components may be mapped to the ambient speaker system. Midrange frequency sound components and high frequency sound components may be mapped to one or more directional speakers in the spatial speaker system. At step 724, audio processing system 104 generates an ambient sound component based on the low frequency sound components of the virtual sound source and based on the stored metadata. The stored metadata includes information related to acoustic characteristics of the loudspeakers 120 and of the physical environment. The stored metadata further includes information related to virtual sound sources that affect the audio in the XR environment, such as virtual sound absorbers and virtual sound reflectors. At step 726, audio processing system 104 outputs or renders the low frequency sound components of the virtual sound source via the ambient speaker system. In performing this step, audio processing system 104 may map the ambient sound components of the audio data to one or more subwoofers. Additionally or alternatively, audio processing system 104 may map the ambient sound components of the audio data related to the virtual sound source equally to all directional loudspeakers 120.

At step 728, audio processing system 104 generates a speaker-specific sound component based on the midrange frequency sound components and high frequency sound components of the virtual sound source and based on the stored metadata. The stored metadata includes information related to acoustic characteristics of the loudspeakers 120 and of the physical environment. The stored metadata further includes information related to virtual sound sources that affect the audio in the XR environment, such as virtual sound absorbers and virtual sound reflectors. At step 730, audio processing system 104 outputs or renders the midrange frequency and high frequency sound components of the audio data related to the virtual sound source via one or more speakers in the spatial speaker system. The method then proceeds to step 720, described above.

Returning to step 706, if the virtual sound source does not generate sound in the XR environment, then the method 700 proceeds to step 712, where audio processing system 104 determines whether the virtual sound source affects sound in the XR environment. If the virtual sound source does not affect sound in the XR environment, then the method 700 proceeds to step 720, described above. If, on the other hand, the virtual sound source does affect sound in the XR environment, then the virtual sound source is a virtual sound absorber and/or a virtual sound reflector. The method 700 proceeds to step 710, where audio processing system 104 computes and stores metadata related to the virtual sound source. The metadata includes, without limitation, the location of the virtual sound source, the orientation of the virtual sound source, and data regarding how the virtual sound source absorbs and/or reflects audio at various frequencies. The method then proceeds to step 720, described above.

In sum, an audio processing system renders XR audio scenes for a loudspeaker system. In some embodiments, the audio processing system renders XR audio scenes for a loudspeaker system in conjunction with one or more sets of headphones. The audio processing system includes an audio analysis and pre-processing application that receives ambient parameters of the physical environment. The audio analysis and pre-processing application further receives data related to one or more virtual objects generated by an XR system. For each virtual object, the audio analysis and pre-processing application may also determine whether the virtual object affects one or more sounds generated by other virtual objects within the audio scene. If the virtual object affects sounds related to other virtual objects, such as by absorbing or reflecting certain sounds, then the analysis and pre-processing application generates and stores metadata that defines how the virtual object affects other sounds.

Further, the audio analysis and pre-processing application determines whether the virtual object generates sound. If the virtual object generates sound, then the analysis and pre-processing application generates a virtual sound source corresponding to the virtual object. The analysis and pre-processing application then determines whether the virtual sound source is an ambient, localized, or mobile sound source. If the virtual sound source is an ambient sound source, then an audio mapping application included in the audio processing system generates ambient audio data. The ambient audio data is based on the virtual object and stored metadata related to other virtual objects and to the physical environment. The audio mapping application renders the ambient sound components of the audio data via the ambient loudspeaker system. If the virtual sound source is a localized sound source or a mobile sound source, then the audio mapping application determines the current location of the virtual sound source and generates speaker-specific audio data. The speaker-specific audio data is based on the virtual object and stored metadata related to other virtual objects and to the physical environment. The audio mapping application renders the speaker-specific sound components of the audio data via the spatial loudspeaker system.

At least one technical advantage of the disclosed techniques relative to the prior art is that audio scenes for XR environments are generated with improved realism and immersive quality relative to prior approaches. Via the disclosed techniques, virtual sound sources are rendered with increased realism through dynamic spatialization of XR virtual audio sources in relation to the location, direction, and/or orientation of the user. Further, a user experiences better audio quality and a more realistic experience than is possible with headphones due to physical characteristics of speakers in terms of directionality and physical sound pressure.

1. In some embodiments, a computer-implemented method for generating an audio scene for an extended reality (XR) environment comprises: determining that a first virtual sound source associated with the XR environment affects a sound in the audio scene; generating a sound component associated with the first virtual sound source based on a contribution of the first virtual sound source to the audio scene; mapping the sound component to a first loudspeaker included in a plurality of loudspeakers; and outputting at least a first portion of the sound component for playback on the first loudspeaker.

2. The computer-implemented method according to clause 1, wherein the first virtual sound source comprises a localized virtual sound source, and further comprising: determining a virtual location associated with the first virtual sound source; and determining that the first loudspeaker is closer to the virtual location than a second loudspeaker included in the plurality of loudspeakers.

3. The computer-implemented method according to clause 1 or clause 2, wherein the first virtual sound source comprises a localized virtual sound source, and further comprising: determining that the first loudspeaker is included in a spatial speaker system that includes a subset of the loudspeakers within the plurality of loudspeakers; determining a virtual location associated with the first virtual sound source; determining that each of the first loudspeaker and a second loudspeaker included in the subset of the loudspeakers is closer to the virtual location than a third loudspeaker included in the subset of the loudspeakers; mapping the sound component to the second loudspeaker; and outputting at least a second portion of the sound component for playback on the second loudspeaker.

4. The computer-implemented method according to any of clauses 1-3, wherein the first virtual sound source comprises a mobile virtual sound source, and further comprising: determining that the first virtual sound source has moved from a first virtual location to a second virtual location; and determining that the first loudspeaker is closer to the second virtual location than a second loudspeaker included in the plurality of loudspeakers.

5. The computer-implemented method according to any of clauses 1-4, further comprising: determining that the first virtual sound source has moved from the second virtual location to a third virtual location; determining that the second loudspeaker is closer to the third virtual location than the first loudspeaker; removing the at least a first portion of the sound component from being output to the first loudspeaker; mapping the sound component to the second loudspeaker; and outputting at least a second portion of the sound component for playback on the second loudspeaker.

6. The computer-implemented method according to any of clauses 1-5, further comprising: determining that a second virtual sound source associated with the XR environment affects a sound in the audio scene; determining that the second virtual sound source comprises a virtual sound absorber that absorbs at least a portion of the sound component associated with the first virtual sound source; determining an absorption value based on the at least a portion of the sound component associated with the first virtual sound source; and reducing the at least a portion of the sound component associated with the first virtual sound source based on the absorption value.

7. The computer-implemented method according to any of clauses 1-6, further comprising: determining that a second virtual sound source associated with the XR environment affects a sound in the audio scene; determining that the second virtual sound source comprises a virtual sound reflector that reflects at least a portion of the sound component associated with the first virtual sound source; determining a reflection value based on the at least a portion of the sound component associated with the first virtual sound source; and increasing the at least a portion of the sound component associated with the first virtual sound source based on the reflection value.

8. The computer-implemented method according to any of clauses 1-7, wherein the first virtual sound source comprises an ambient virtual sound source, and the first loudspeaker comprises a subwoofer.

9. The computer-implemented method according to any of clauses 1-8, wherein the first virtual sound source comprises an ambient virtual sound source, and further comprising: determining that the first loudspeaker is included in a spatial speaker system that includes a subset of the loudspeakers within the plurality of loudspeakers; mapping the sound component to each loudspeaker included in the plurality of loudspeakers in addition to the first loudspeaker; and outputting at least a portion of the sound component for playback on each loudspeaker included in the plurality of loudspeakers in addition to the first loudspeaker.

10. In some embodiments, a computer-readable storage medium includes instructions that, when executed by a processor, cause the processor to generate an audio scene for an extended reality (XR) environment, by performing the steps of determining that a first virtual sound source associated with the XR environment affects a sound in the audio scene; generating a sound component associated with the first virtual sound source based on a contribution of the first virtual sound source to the audio scene; mapping the sound component to a first speaker included in a plurality of speakers based on an audio frequency present in the sound component; and outputting the sound component for playback on the first speaker.

11. The computer-readable storage medium according to clause 10, wherein the first virtual sound source comprises an ambient virtual sound source, and the first speaker comprises a subwoofer.

12. The computer-readable storage medium according to clause 10 or clause 11, further comprising: determining that the first virtual sound source is placed at a fixed virtual location; classifying the sound component associated with the first virtual sound source as a localized virtual sound source; and determining that the first speaker is closer to the fixed virtual location than a second speaker included in the plurality of speakers.

13. The computer-readable storage medium according to any of clauses 10-12, further comprising: determining that the first virtual sound source is placed at a fixed virtual location; classifying the sound component associated with the first virtual sound source as a localized virtual sound source; determining that each of the first speaker and a second speaker included in the plurality of speakers is closer to the fixed virtual location than a third speaker included in the plurality of speakers; mapping the sound component to the second speaker; and outputting at least a second portion of the sound component for playback on the second speaker.

14. The computer-readable storage medium according to any of clauses 10-13, further comprising: determining that the first virtual sound source has moved from a first virtual location to a second virtual location; classifying the sound component associated with the first virtual sound source as a mobile virtual sound source; and determining that the first speaker is closer to the second virtual location than a second speaker included in the plurality of speakers.

15. The computer-readable storage medium according to any of clauses 10-14, further comprising: determining that the first virtual sound source has moved from the second virtual location to a third virtual location; determining that the second speaker is closer to the third virtual location than the first speaker; removing the at least a first portion of the sound component from being output to the first speaker; mapping the sound component to the second speaker; and outputting at least a second portion of the sound component for playback on the second speaker.

16. The computer-readable storage medium according to any of clauses 10-15, further comprising: determining that the first virtual sound source includes a sound component that is below a specified frequency; classifying the sound component as an ambient virtual sound source; mapping the sound component to each speaker included in the plurality of speakers in addition to the first speaker; and outputting at least a portion of the sound component for playback on each speaker included in the plurality of speakers in addition to the first speaker.

17. The computer-readable storage medium according to any of clauses 10-16, wherein the first virtual sound source comprises a low frequency sound component, and the first speaker comprises a subwoofer.

18. The computer-readable storage medium according to any of clauses 10-17, wherein the first virtual sound source comprises at least one of a midrange frequency sound component and a high frequency sound component, and wherein the first speaker is included in a spatial speaker system that includes a subset of the speakers within the plurality of speakers.

19. The computer-readable storage medium according to any of clauses 10-18, wherein the first speaker is within a threshold distance from the first virtual sound source, and the first speaker comprises a head-mounted speaker.

20. In some embodiments, a system, comprises: a plurality of speakers; and an audio processing system coupled to the plurality of speakers and configured to: determine that a first virtual object included in an extended reality (XR) environment is associated with a first virtual sound source; determine that the first virtual sound source affects a sound in an audio scene associated with the XR environment; generate a sound component associated with the first virtual sound source based on a contribution of the first virtual sound source to the audio scene; map the sound component to a first loudspeaker included in a plurality of loudspeakers; and output the sound component for playback on the first loudspeaker.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating an audio scene for an extended reality (XR) environment, the method comprising:
    determining that a first virtual sound source that has a high frequency component and is associated with the XR environment affects a sound in the audio scene;
    generating a sound component associated with the first virtual sound source based on a contribution of the first virtual sound source to the audio scene;
    determining a first cost associated with assigning the first virtual sound source to a first loudspeaker included in a plurality of loudspeakers, wherein each loudspeaker included in the plurality of loudspeakers emits sound waves, wherein the first cost is determined based on:
        an angular distance between the first virtual sound source and the first loudspeaker with respect to a user location, and
        a frequency bias function that weights the first virtual sound source higher than a second virtual sound source, wherein frequency components of the second virtual sound source are of lower frequency than the high frequency component;
    mapping the sound component to the first loudspeaker based, at least in part, on the first cost; and outputting at least a first portion of the sound component for playback on the first loudspeaker.

2. The computer-implemented method of claim 1, wherein determining the first cost further comprises applying a weight value to the angular distance to determine the first cost, the weight value being based on a dominant audio frequency of the first virtual sound source.

3. The computer-implemented method of claim 1, wherein the first virtual sound source comprises a localized virtual sound source, and wherein determining the first cost further comprises:
   determining a virtual location associated with the first virtual sound source; and
   determining that a cost of the first loudspeaker for the virtual location is lower than a cost of a second loudspeaker included in the plurality of loudspeakers.

4. The computer-implemented method of claim 1, wherein the first virtual sound source comprises a localized virtual sound source, and wherein determining the first cost further comprises:
   determining that the first loudspeaker is included in a spatial speaker system that includes a subset of the loudspeakers within the plurality of loudspeakers,
   determining a virtual location associated with the first virtual sound source, and
   determining that each of a cost of the first loudspeaker and a cost of a second loudspeaker included in the subset of the loudspeakers for the virtual location is lower than a cost of a third loudspeaker included in the subset of the loudspeakers;
   and further comprising:
      mapping the sound component to the second loudspeaker; and
      outputting at least a second portion of the sound component for playback on the second loudspeaker.

5. The computer-implemented method of claim 1, wherein the first virtual sound source comprises a mobile virtual sound source, and wherein determining the first cost further comprises:
   determining that the first virtual sound source has moved from a first virtual location to a second virtual location; and
   determining that a cost of the first loudspeaker for the second virtual location is lower than a cost of a second loudspeaker included in the plurality of loudspeakers.

6. The computer-implemented method of claim 5, wherein determining the first cost further comprises:
   determining that the first virtual sound source has moved from the second virtual location to a third virtual location, and
   determining that a cost of the second loudspeaker for the third virtual location is lower than a cost of the first loudspeaker;
   and further comprising:
      removing the at least the first portion of the sound component from being output to the first loudspeaker;
      mapping the sound component to the second loudspeaker; and
      outputting at least a second portion of the sound component for playback on the second loudspeaker.

7. The computer-implemented method of claim 1, wherein a third virtual sound source associated with the XR environment affects the sound in the audio scene, and wherein determining the first cost further comprises:
   determining that the third virtual sound source comprises a virtual sound absorber that absorbs at least a portion of the sound component associated with the first virtual sound source, and
   determining an absorption value based on the at least the portion of the sound component associated with the first virtual sound source;
   and further comprising reducing the at least the portion of the sound component associated with the first virtual sound source based on the absorption value.

8. The computer-implemented method of claim 1, wherein a third virtual sound source associated with the XR environment affects the sound in the audio scene, and wherein determining the first cost further comprises:
   determining that the third virtual sound source comprises a virtual sound reflector that reflects at least a portion of the sound component associated with the first virtual sound source, and
   determining a reflection value based on the at least the portion of the sound component associated with the first virtual sound source;
   and further comprising increasing the at least the portion of the sound component associated with the first virtual sound source based on the reflection value.

9. The computer-implemented method of claim 1, wherein the first virtual sound source comprises an ambient virtual sound source, and wherein determining the first cost further comprises:
   determining that the first loudspeaker is included in a spatial speaker system that includes a subset of the loudspeakers within the plurality of loudspeakers;
   and further comprising:
      mapping the sound component to each loudspeaker included in the plurality of loudspeakers in addition to the first loudspeaker; and
      outputting at least a portion of the sound component for playback on each loudspeaker included in the plurality of loudspeakers in addition to the first loudspeaker.

10. The computer-implemented method of claim 1, wherein the first virtual sound source comprises an ambient virtual sound source, and the first loudspeaker comprises a subwoofer.

11. One or more non-transitory computer-readable media including instructions that, when executed by one or more processors, cause the one or more processors to generate an audio scene for an extended reality (XR) environment, by performing the steps of:
   determining that a first virtual sound source that has a high frequency component and is associated with the XR environment affects a sound in the audio scene;
   generating a sound component associated with the first virtual sound source based on a contribution of the first virtual sound source to the audio scene;
   determining a first cost associated with assigning the first virtual sound source to a first loudspeaker included in a plurality of loudspeakers, wherein each loudspeaker included in the plurality of loudspeakers emits sound waves, wherein the first cost is determined based on:
      an angular distance between the first virtual sound source and the first loudspeaker with respect to a user location, and
      a frequency bias function that weights the first virtual sound source higher than a second virtual sound source, wherein frequency components of the second virtual sound source are of lower frequency than the high frequency component;

mapping the sound component to the first loudspeaker based, at least in part, on the first cost; and outputting the sound component for playback on the first loudspeaker.

12. The one or more non-transitory computer-readable media of claim 11, wherein the first virtual sound source comprises an ambient virtual sound source, and the first loudspeaker comprises a subwoofer.

13. The one or more non-transitory computer-readable media of claim 11, further comprising:
   determining that the first virtual sound source is placed at a fixed virtual location;
   classifying the sound component associated with the first virtual sound source as a localized virtual sound source; and
   determining that the first loudspeaker is closer to the fixed virtual location than a second loudspeaker included in the plurality of loudspeakers.

14. The one or more non-transitory computer-readable media of claim 11, further comprising:
   determining that the first virtual sound source is placed at a fixed virtual location;
   classifying the sound component associated with the first virtual sound source as a localized virtual sound source;
   determining that each of the first loudspeaker and a second loudspeaker included in the plurality of loudspeakers is closer to the fixed virtual location than a third loudspeaker included in the plurality of loudspeakers;
   mapping the sound component to the second loudspeaker; and
   outputting at least a second portion of the sound component for playback on the second loudspeaker.

15. The one or more non-transitory computer-readable media of claim 11, further comprising:
   determining that the first virtual sound source has moved from a first virtual location to a second virtual location;
   classifying the sound component associated with the first virtual sound source as a mobile virtual sound source; and
   determining that the first loudspeaker is closer to the second virtual location than a second loudspeaker included in the plurality of loudspeakers.

16. The one or more non-transitory computer-readable media of claim 15, further comprising:
   determining that the first virtual sound source has moved from the second virtual location to a third virtual location;
   determining that the second loudspeaker is closer to the third virtual location than the first loudspeaker;
   removing the at least a first portion of the sound component from being output to the first loudspeaker;
   mapping the sound component to the second loudspeaker; and
   outputting at least a second portion of the sound component for playback on the second loudspeaker.

17. The one or more non-transitory computer-readable media of claim 11, further comprising:
   determining that the first virtual sound source includes a sound component that is below a specified frequency;
   classifying the sound component as an ambient virtual sound source;
   mapping the sound component to each loudspeaker included in the plurality of loudspeakers in addition to the first loudspeaker; and
   outputting at least a portion of the sound component for playback on each loudspeaker included in the plurality of loudspeakers in addition to the first loudspeaker.

18. The one or more non-transitory computer-readable media of claim 11, wherein the first virtual sound source comprises a low frequency sound component, and the first loudspeaker comprises a subwoofer.

19. The one or more non-transitory computer-readable media of claim 11, wherein the first virtual sound source comprises at least one of a midrange frequency sound component and a high frequency sound component, and wherein the first loudspeaker is included in a spatial speaker system that includes a subset of the loudspeakers within the plurality of loudspeakers.

20. The one or more non-transitory computer-readable media of claim 11, wherein the first loudspeaker is within a threshold distance from the first virtual sound source, and the first loudspeaker comprises a head-mounted speaker.

21. A system, comprising:
   a plurality of speakers; and
   an audio processing system coupled to the plurality of speakers and configured to:
      determine that a first virtual object included in an extended reality (XR) environment is associated with a first virtual sound source that has a high frequency component;
      determine that the first virtual sound source affects a sound in an audio scene associated with the XR environment;
      generate a sound component associated with the first virtual sound source based on a contribution of the first virtual sound source to the audio scene;
      determine a first cost associated with assigning the first virtual sound source to a first speaker included in the plurality of speakers, wherein each speaker included in the plurality of speakers emits sound waves, wherein the first cost is determined based on:
         an angular distance between the first virtual sound source and the first speaker with respect to a user location, and
         a frequency bias function that weights the first virtual sound source higher than a second virtual sound source, wherein frequency components of the second virtual sound source are of lower frequency than the high frequency component;
      map the sound component to the first speaker based, at least in part, on the first cost; and
      output the sound component for playback on the first speaker.

* * * * *